US007248232B1

(12) United States Patent
Yamazaki et al.

(10) Patent No.: US 7,248,232 B1
(45) Date of Patent: Jul. 24, 2007

(54) INFORMATION PROCESSING DEVICE

(75) Inventors: Shunpei Yamazaki, Tokyo (JP); Jun Koyama, Kanagawa (JP); Yoshiharu Hirakata, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 09/255,605

(22) Filed: Feb. 22, 1999

(30) Foreign Application Priority Data

Feb. 25, 1998 (JP) .................. 10-060441

(51) Int. Cl.
*G09G 3/36* (2006.01)
(52) U.S. Cl. .................. 345/8; 345/1.1; 345/2.3; 345/7; 345/31; 345/208; 348/53; 348/207; 359/466
(58) Field of Classification Search .......... 345/7, 345/8, 31, 115, 1.1, 2.3, 208; 348/53, 207; 359/466; 438/166, 186
See application file for complete search history.

(56) References Cited

U.S. PATENT DOCUMENTS

| 4,028,725 | A |   | 6/1977  | Lewis          | 358/104 |
|-----------|---|---|---------|----------------|---------|
| 4,310,849 | A |   | 1/1982  | Glass          | 358/88  |
| 5,146,267 | A | * | 9/1992  | Riley          | 355/68  |
| 5,151,688 | A |   | 9/1992  | Tanaka et al.  | 340/707 |
| 5,261,156 | A |   | 11/1993 | Mase et al.    |         |
| 5,276,471 | A | * | 1/1994  | Yamauchi et al.| 351/153 |
| 5,281,957 | A | * | 1/1994  | Schoolman      | 345/8   |
| 5,281,960 | A | * | 1/1994  | Dwyer, III     | 345/31  |
| 5,446,564 | A |   | 8/1995  | Mawatari et al.| 359/72  |
| 5,541,747 | A | * | 7/1996  | Nishi et al.   | 349/49  |
| 5,559,358 | A |   | 9/1996  | Burns et al.   | 257/431 |
| 5,583,335 | A |   | 12/1996 | Spitzer et al. | 250/221 |
| 5,594,569 | A |   | 1/1997  | Konuma et al.  | 349/122 |
| 5,643,826 | A |   | 7/1997  | Ohtani et al.  |         |
| 5,661,604 | A |   | 8/1997  | Kuba           | 359/637 |
| 5,742,264 | A |   | 4/1998  | Inagaki et al. | 345/8   |

(Continued)

FOREIGN PATENT DOCUMENTS

EP     0 499 979 A2    8/1992

(Continued)

OTHER PUBLICATIONS

Communication System; Guenter Bertsch; Pub. No. JP408087470A; Pub. date Apr. 2, 1996.*

(Continued)

*Primary Examiner*—Bipin Shalwala
*Assistant Examiner*—Vincent E. Kovalick
(74) *Attorney, Agent, or Firm*—Cook, Alex, McFarron, Manzo, Cummings & Mehler, Ltd.

(57) ABSTRACT

There is provided an information processing apparatus which occupies a small space and which is capable of supplying image information having high definition and high resolution. An information processing apparatus of the invention employs a head mount display (HMD) utilizing compact flat panel displays as a display device for displaying information. The use of a head mount display as the display device of the information processing apparatus prevents any reduction in a work space. It also makes it possible to change the size of a virtual display screen freely. In addition, the information processing apparatus of the invention is capable of displaying a plurality of pieces of information on the virtual display screen at a time.

42 Claims, 20 Drawing Sheets

U.S. PATENT DOCUMENTS

| | | | |
|---|---|---|---|
| 5,751,260 A | 5/1998 | Nappi et al. ................... 345/8 |
| 5,784,569 A * | 7/1998 | Miller et al. ................ 709/235 |
| 5,790,099 A | 8/1998 | Okada ......................... 345/157 |
| 5,867,817 A * | 2/1999 | Catallo et al. ............... 704/255 |
| 5,920,401 A | 7/1999 | Street et al. ................ 358/400 |
| 5,923,962 A | 7/1999 | Ohtani et al. |
| 5,926,238 A | 7/1999 | Inoue et al. ................... 349/61 |
| 5,963,187 A | 10/1999 | Tanaka et al. ................ 345/97 |
| 5,971,538 A * | 10/1999 | Heffner ....................... 351/137 |
| 5,991,085 A | 11/1999 | Rallison et al. ............. 359/630 |
| 5,995,936 A | 11/1999 | Brais et al. .................. 704/275 |
| 6,011,275 A | 1/2000 | Ohtani et al. .................. 257/59 |
| 6,011,653 A * | 1/2000 | Karasawa ................... 359/630 |
| 6,037,635 A | 3/2000 | Yamazaki .................... 257/353 |
| 6,040,812 A * | 3/2000 | Lewis .......................... 345/89 |
| 6,043,800 A * | 3/2000 | Spitzer et al. .................. 345/8 |
| 6,046,712 A * | 4/2000 | Beller et al. .................... 345/8 |
| 6,066,518 A | 5/2000 | Yamazaki .................... 438/166 |
| 6,072,193 A | 6/2000 | Ohnuma et al. ............... 257/57 |
| 6,072,445 A * | 6/2000 | Spitzer et al. .................. 345/8 |
| 6,087,245 A | 7/2000 | Yamazaki et al. .......... 438/486 |
| 6,087,679 A | 7/2000 | Yamazaki et al. |
| 6,091,378 A | 7/2000 | Richardson et al. ............ 345/7 |
| 6,091,546 A | 7/2000 | Spitzer ....................... 359/618 |
| 6,093,934 A | 7/2000 | Yamazaki et al. ............. 257/51 |
| 6,093,937 A | 7/2000 | Yamazaki et al. ............. 257/59 |
| 6,097,352 A | 8/2000 | Zavracky et al. ............... 345/7 |
| 6,115,007 A | 9/2000 | Yamazaki ...................... 345/7 |
| 6,121,660 A | 9/2000 | Yamazaki et al. .......... 257/348 |
| 6,127,998 A | 10/2000 | Ichikawa et al. ............ 345/100 |
| 6,133,075 A | 10/2000 | Yamazaki et al. .......... 438/158 |
| 6,140,667 A | 10/2000 | Yamazaki et al. |
| 6,153,445 A | 11/2000 | Yamazaki et al. ............ 438/30 |
| 6,160,271 A | 12/2000 | Yamazaki et al. |
| 6,162,667 A * | 12/2000 | Funai et al. ................. 438/166 |
| 6,165,824 A | 12/2000 | Takano et al. ............... 438/160 |
| 6,172,657 B1 | 1/2001 | Kamakura et al. .............. 345/8 |
| 6,235,563 B1 * | 5/2001 | Oka et al. .................... 438/166 |
| 6,236,063 B1 | 5/2001 | Yamazaki et al. ............. 257/59 |
| 6,243,155 B1 | 6/2001 | Zhang et al. ................ 349/199 |
| 6,307,214 B1 | 10/2001 | Ohtani et al. |
| 6,349,001 B1 * | 2/2002 | Spitzer ........................... 345/8 |
| 6,452,572 B1 * | 9/2002 | Fan et al. ....................... 345/8 |
| 6,496,240 B1 | 12/2002 | Zhang et al. ................ 349/116 |
| 6,580,405 B1 | 6/2003 | Yamazaki et al. ............... 345/7 |
| 6,867,752 B1 | 3/2005 | Yamazaki et al. ............... 345/8 |
| 2005/0195129 A1 | 9/2005 | Yamazaki et al. ............... 345/8 |

FOREIGN PATENT DOCUMENTS

| | | |
|---|---|---|
| EP | 0 686 957 A2 | 12/1995 |
| EP | 0 720 338 A2 | 7/1996 |
| EP | 0 827 337 A1 | 3/1998 |
| JP | 10-294280 | 11/1998 |
| JP | 11-345767 | 12/1999 |
| JP | 11-354442 | 12/1999 |
| WO | WO 96/07947 A1 | 3/1996 |

OTHER PUBLICATIONS

JP 07-130652 English abstract.
JP 07-014880 English abstract.
JP 08-078329 English abstract.
U.S. Appl. No. 09/244,760 (pending) to Yamazaki et al filed Feb. 5, 1999, including original specification, claims, abstract, drawings, PTO filing receipt and pending claims.
U.S. Appl. No. 09/385,019 (pending) to Yamazaki et al filed Aug. 30, 1999, including original specification, claims, abstract, drawings, PTO filing receipt and pending claims.
English abstract re Japanese Patent Application No. JP 10-294280, published Nov. 4, 1998.
English abstract re Japanese Patent Application No. JP 11-345767, published Dec. 14, 1999.
English abstract re Japanese Patent Application No. JP 11-354442, published Dec. 24, 1999.
U.S. Appl. No. 09/244,760 (pending).
U.S. Appl. No. 09/385,019 (pending).
Shinohara, T. et al, "High-Perfomance Polycrystalline Silicon TFTs Using Self-Aligned Grain Boundry Control Technique," Electronics and Communications in Japan, Part II: Electronics, vol. 76, No. 10, pp. 99-106, Oct. (1993).
Kuriyama, H. et al, "Comprehensive Study of Lateral Grain Growth in Poly-Si Films by Excimer Laser Annealing and its Application to Thin Film Transistors," Japanese Journal of Applied Physics, vol. 33, part 1, No. 10, pp. 5657-5662, Oct. (1994).
Inui, S. et al, "Thresholdless Antiferroelectricity in Liquid Crystals and its Application to Dislays," J. Mater. Chem., vol. 6, No. 4, pp. 671-673, (1996).
Kobayashi, Y. et al, "The Application of a Bistable Device to Reflective Guest-Host LCDs," SID 97 Digest, pp. 405-408, (1997).
Yoshida, T. et al, "A Full-Color Thresholdless Antiferroelectric LCD Exhibiting Wide Viewing Angle with Fast Response Time," SID 97 Digest, pp. 841-844, (1997).
Furue, H. et al, "Characteristics and Driving Scheme of Polymer-Stabilized Monostable FLCD Exhibiting Fast Response Time and High Contrast Ratio with Gray-Scale Capability," SID 98 Digest, pp. 782-785, (1998).
Ohtani, H. et al, "Late-News Poster: A 60-in. HDTV Rear-Projector with Continuous-Grain-Silicon Technology," SID 98 Digest, pp. 467-470 (1998).
Ohtani, H. et al, "Continuous-Grain Silicon Makes the HDTV Retro-Projector Sizzle," Information Display, vol. 14, No. 11, pp. 22-24, Nov. (1998).
Shinohara, T. et al, "High-Performance Polycrystalline Silicon TFTs Using Self-Aligned Grain Boundary Control Technique," Electronics and Communications in Japan, Part II: Electronics, vol. 76, No. 10, pp. 99-106, (Oct., 1993).

* cited by examiner 1314, 1318, 1322, : LOW CONCENTRATION IMPURITY REGIONS

| 1401 | SUBSTRATE | 1407 | LOW CONCENTRATION IMPURITY REGION (LDD REGION) |
| 1402 | SILICON OXIDE FILM | | |
| 1403 | GATE ELECTRODE | 1408 | CHANNEL FORMATION REGION |
| 1404 | GATE INSULATION FILM | 1409 | CHANNEL PROTECTION FILM |
| 1405 | SOURCE REGION | 1410 | LAYER INSULATION FILM |
| 1406 | DRAIN REGION | 1411 | SOURCE ELECTRODE |
| | | 1412 | DRAIN ELECTRODE |

1501 INSULATING SUBSTRATE
1503 PIXEL MATRIX CIRCUIT
1504 GATE - SIDE DRIVING CIRCUIT
1505 SOURCE - SIDE DRIVING CIRCUIT
1506 LOGIC CIRCUIT
1507 COUNTER SUBSTRATE
1508 FPC

SCHEMATIC VIEW OF PRIOR ART INFORMATION
PROCESSING APPARATUS

INFORMATION PROCESSING DEVICE

BACKGROUND OF THE INVENTION

1. Field of the Invention

The present invention relates to an information processing device and a system utilizing a head mount display (HMD).

2. Description of the Related Art

Users who deal with electronic information have carried out information processing operations using an information processing apparatus as schematically shown in FIG. 20. In the context of this specification, "information processing operation" means input, acquisition, transmission, exchange, storage, administration and the like of information carried out using a computer or the like.

An input terminal 2001 which is a keyboard, mouse or the like is a device to allow a user to perform an operation of inputting information. A controller 2002 such as a computer connected to the input terminal 2001 is a device to perform processes such as storage, calculation and communication of information. A display device 2003 such as a CRT is a device for outputting information and displaying the same as an image.

In a conventional information processing apparatus, a display device 2003 such as a CRT occupies a large part of a space on a work desk on which the information processing apparatus is operated. Further, the recent increase in the amount of information (characters, images and the like) has resulted in a need for displaying a plurality of pieces of information at a time.

In order to recognize a plurality of pieces of information with reliability, attempts have been made to increase the size of the screens of display devices. However, the volume and weight of a conventional display device such as a CRT have become considerably large with an increase in the screen size, which has made the display device unsuitable for daily use. Further, continued use for a long period of time has been avoided because it has bad influence on human eyes (fatigue, amblyopia and the like).

This has resulted in the spread of flat panel display devices whose bodies are smaller in depth and lighter than those of CRTs. Especially, products utilizing a liquid crystal panel are widely used among such flat panel displays.

Compact liquid crystal panels are portable because they are very light. Liquid crystal panels are advantageous also in that they have less influence on human eyes compared to CRTs. However, they are expensive as display devices for daily use when they are in large screen sizes because they suffer from bad yield of production.

Although flat panel displays such as liquid crystal displays have recently come in practice to replace CRTs as described above, a display of an information processing apparatus still occupies a large part of a space on a work desk.

The present invention has been conceived taking the above-described problem into consideration, and it is an object of the present invention to provide a novel information processing apparatus in which the above-describe problem is solved.

SUMMARY OF THE INVENTION

In an information processing apparatus (device) according to the present invention, a head mount display (HMD) utilizing a compact flat panel display (typically a liquid crystal display) is used as a display for displaying information. The use of a head mount display as a display device for an information processing apparatus makes it possible to solve the problem of the size of a display device encountered in the prior art. A head mount display is advantageous in that it does not reduce an operating space because it is mounted on an operator's head during use and in that the size of a virtual display screen thereof can be freely changed.

A head mount display (HMD) displays an image in a position a few centimeters ahead the user's eyes using an optical system to cause the user's eyes to recognize the image with a sense of virtual reality as if it is displayed on a large display device.

An HMD used in an information processing apparatus according to the present invention has high resolution unlike those in the prior art which have low display resolution, can be driven at a high speed and can display a plurality of pieces of information on a virtual display screen thereof.

Since conventional HMDs have had low resolution, it has been difficult in practice to recognize characters with them. Further, conventional HMDs give fatigue of a considerable degree when used a few hours continuously. In addition, they can result in symptoms that resemble car sickness. Therefore, they are unsuitable as display devices for information processing apparatuses. It is believed that such problems with conventional HMDs can adversely affect eyes and are very much serious from the viewpoint of health.

One of the most significant problems of HMDs is flickers in images provided by HMDS. Such flickers in images are caused by alternating driving performed to prevent the deterioration of liquid crystal materials and to maintain the quality of display. When the inversion period of the positive and negative polarities of a voltage applied to each pixel (inversion period) is in a frequency band which is visible to human eyes (on the order of about 30 Hz), a flicker is visually recognized as a result of a slight difference between a display from an image signal that appears when the signal has the positive polarity and a display that appears when the signal has the negative polarity.

An HMD utilizing a liquid crystal panel having high definition and resolution will have a very high driving frequency. For example, the NTSC and HDTV standards specify required numbers of pixels of about 400,000 and about 2,000,000, respectively. Therefore, the maximum frequency of an input image signal is at about 6 MHz according to the NTSC standard and is in the range from about 20 MHz to about 30 MHz according to the HDTV standard. In order to display such an image signal accurately, a clock signal is required which is at a frequency several times higher than that of the image signal (e.g., within the range from about 50 MHz to about 60 MHz).

In a conventional HMD, it has been difficult to drive the liquid crystal display by accurately alternating such an image signal and clock signal having a high frequency band. The reason is that it has been impossible to manufacture thin film transistors (TFTs) that can accurately operate in such a high frequency from amorphous silicon or polycrystalline silicon.

When an image signal having a dot clock at a very high speed is to be displayed, conventional TFTs have had in a problem in that inaccurate display results from phase shift, noises, the rounding of a signal waveform and the like because periods for writing the image signal in display pixels become short.

An HMD used in an information processing apparatus according to the present invention utilizes TFTs that can be driven at a high speed in a liquid crystal panel incorporated therein. This makes it possible to provide an HMD having high definition and resolution that is free from flickers in images.

Configurations of an information processing apparatus according to the present invention will now be described.

According to an embodiment of the present invention, there is provided an information processing apparatus characterized in that it comprises:

a display device having flat panel displays for right and left eyes mounted on the head of a user;

a controller connected to the display device; and an input operation device connected to the controller and in that the flat panel displays are capable of displaying a plurality of pieces of information at a time. Thus, the above-described object is achieved.

According to another embodiment of the invention, there is provided an information processing apparatus characterized in that it comprises:

a display device having flat panel displays for right and left eyes mounted on the head of a user;

a controller; and an input operation device connected to the controller, in that controller transmits a signal in the form of an electric wave to the display device and in that the flat panel displays are capable of displaying a plurality of pieces of information at a time. The above-described object is thus achieved.

According to still another embodiment of the invention, there is provided an information processing apparatus characterized in that it comprises:

a display device having flat panel displays for right and left eyes mounted on the head of a user;

a controller;

an image pick-up device; and an input operation device connected to the controller, in that controller transmits a signal in the form of an electric wave to the display device, in that the image pick-up device converts at least images of the input operation device and a hand of the user into electrical signals and supplies the electrical signals to the controller and in that the flat panel displays display a plurality of pieces of information including at least the images of the input operation device and the hand of the user at a time. The above-described object is thus achieved.

Channel formation regions of TFTs connected to pixel electrodes of the flat panel displays of the display device may be constituted by a semiconductor thin film formed by a collection of a plurality of bar-shaped or planar bar-shaped crystals formed on an insulating surface.

The plane of the channel formation regions may be oriented substantially in a {110}-direction.

In grain boundaries in the channel formation regions, 90% or more of the crystal lattices may have continuity.

The flat panel displays may have a display device on which one screen is written at frequencies in the range from 30 Hz to 180 Hz and on which screen display is carried out with the polarity of the voltage applied to the pixel electrodes inverted for each screen.

The flat panel display may have a display device which is a liquid crystal display using a liquid crystal material which is antiferroelectric liquid crystals or ferroelectric liquid crystals substantially having no threshold.

DETAILED DESCRIPTION OF PREFERRED EMBODIMENTS

Figure 1:
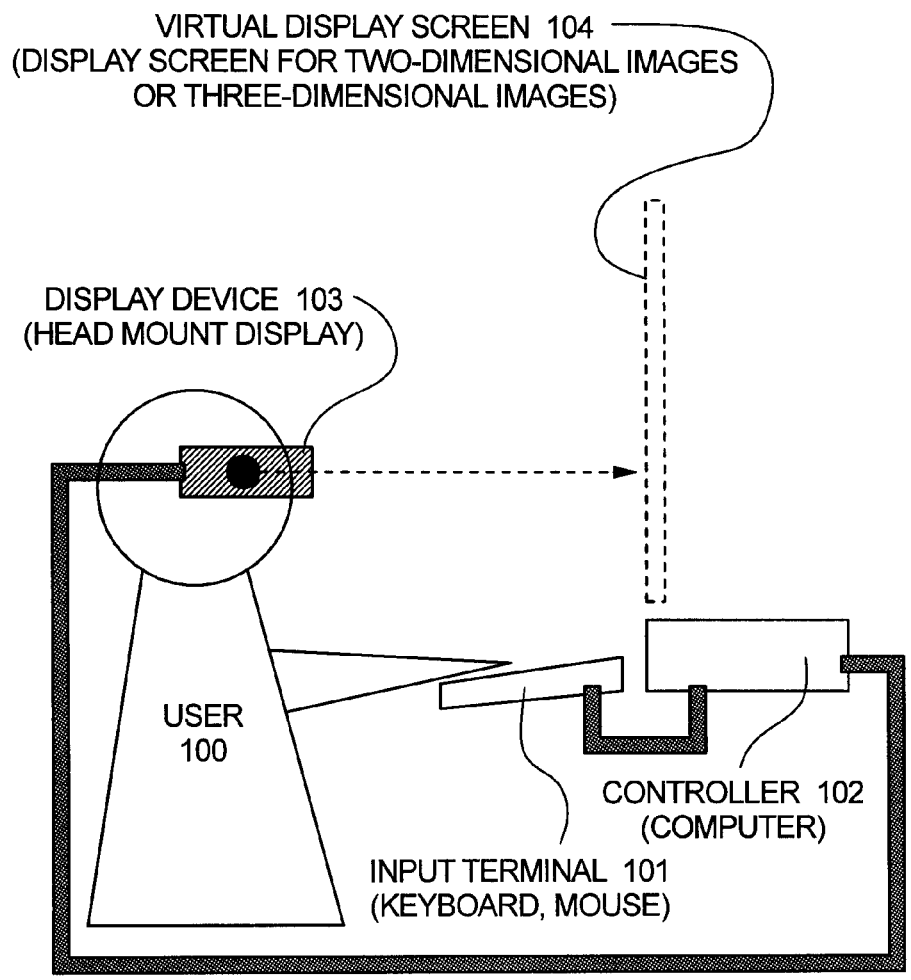
FIG. 1 is a schematic view of an embodiment of an information processing apparatus according to the present invention.

FIG. 1 is a schematic view of an information processing apparatus according to the present invention. With the information processing apparatus according to the invention, a user 100 can perform information processing operations using an input terminal 101 and a controller 102 while watching a virtual display screen 104 with a display device (head mount display (HMD)) 103 mounted on his or her head.

Figure 2:
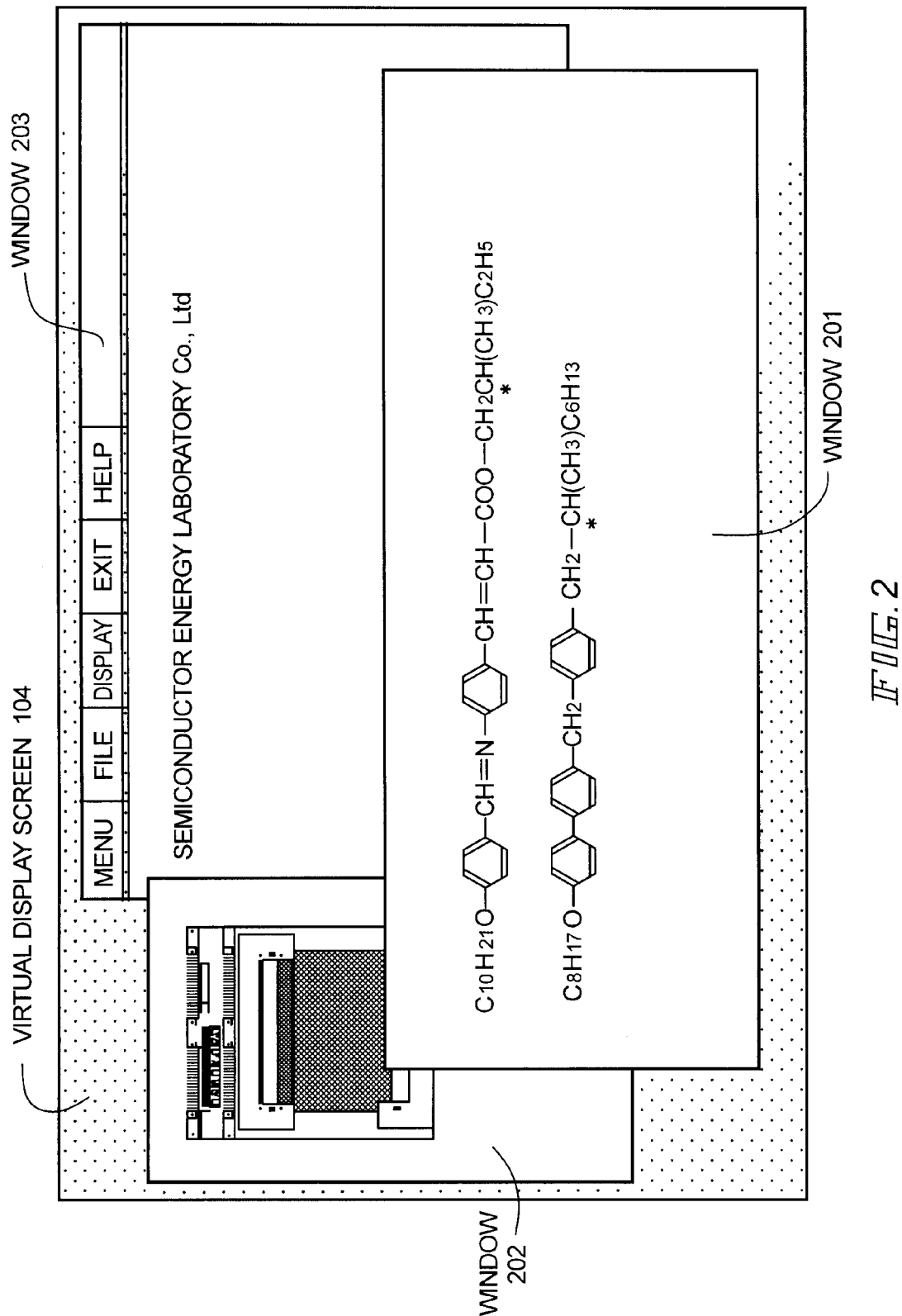
FIG. 2 illustrates a virtual display screen of the information processing apparatus according to the present invention.

The display device (HMD) 103 used in the information processing apparatus according to the invention can provide display with high definition and resolution. As a result, a plurality of pieces of information can be displayed at a time on the virtual display screen 104 observed by the user 100 as shown in FIG. 2. FIG. 2 shows the virtual display screen 104. As shown in FIG. 2, the virtual display screen 104 shows various pieces of information on a plurality of window screens 201 through 203.

Flat panel displays for right and left eyes are incorporated in the display device 103 used in the information processing apparatus of the invention. This is not to limit the present invention, and it is possible to use any display device incorporating flat panel displays for right and left eyes which can be mounted on the head of a user to provide a virtual display screen (a display screen for two-dimensional images or three-dimensional images) having resolution at which characters can be recognized.

The flat panel displays used as the display device used in the information processing apparatus of the invention may be flat panel displays in which the semiconductor films for the switching elements are formed from continuous grain silicon (CGS).

The display device used in the information processing apparatus of the present invention is driven using frame inversion driving wherein the positive and negative polarities of a voltage applied to all pixels are inverted for each frame (screen) at a frequency band (about 30 Hz or more) which is invisible to human eyes even if the distance between the flat panel displays and the eyes is as small as a few centimeters. There is no limitation on the flat panel displays incorporated in the display device used in the information processing apparatus according to the present invention as long as they are liquid crystal panels which perform line sequential scanning of pixel TFTs and which use A.C. drives (alternating drives) at a frequency band (about 30 Hz or more) which is invisible to human eyes.

There is no limitation on the input terminal 101 of the information processing apparatus according to the present invention as long as it is a device with which a user can input information to the controller. Typical devices include keyboards, mice, controllers, cameras and microphones.

There is no limitation on the controller 102 as long as it is a device which includes at least means for receiving information from the input terminal, means for storing electronic information and means for transmitting image information to the display device.

Wiring using electrical cords and optical fibers may be used as the means for inputting information to the controller and the means for transmitting image information to the display device. Further, a cordless configuration may be employed wherein information is transmitted in the form of light or electric waves.

While several embodiments of the present invention will be described below, the information processing apparatus of the invention is not limited to those embodiments.

A first embodiment of the present invention will now be described.

Figure 3:
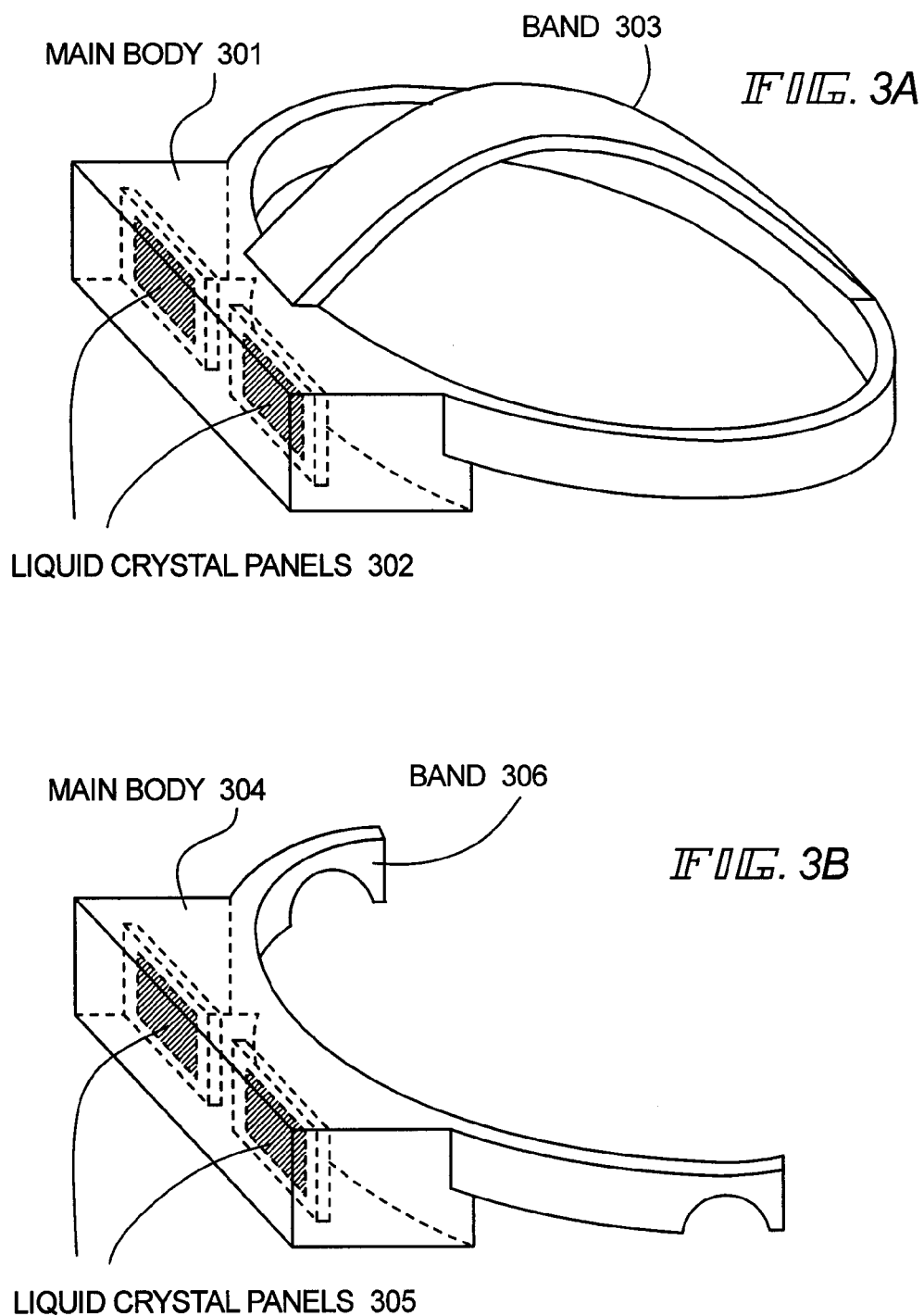
FIGS. 3A and 3B show examples of the head mount display used in the information processing apparatus according to the present invention.

FIG. 1 is a schematic view of an information processing apparatus of the present invention. FIG. 2 shows a virtual display screen 104. FIGS. 3A and 3B show the appearance of display devices (head mount displays) 103. The display devices 103 of the present embodiment display 2D (two-dimensional) images.

As shown in FIG. 1, the display 103 is electrically connected to an input terminal 101 and a controller 102 (computer or the like). Those elements collectively form an information processing apparatus and an information processing system.

FIG. 2 also shows a virtual display screen 104. As shown in FIG. 2, various pieces of information such as a plurality of window screens 201 through 203 are displayed on the virtual display screen 104.

FIGS. 3A and 3B show display devices (head mount displays) 103. Referring to FIG. 3A, the HMD 104 has a configuration including a band 303 for fixing a main body 201 on a head and two active matrix type compact liquid crystal panels 302 in a dimension in the range from 0.2 to 2.6 inches for displaying images. In the present embodiment, transmission type active matrix liquid crystal panels of 1.4 inches are used. FIG. 3B shows a display device 104 which feels like eyeglasses or sunglasses when worn.

One liquid crystal panel 302 or 305 is provided for each of right and left eyes of a user. Referring to the arrangement of the liquid crystal panels 302 or 305, in addition to the configuration shown in FIG. 2, a configuration may be employed in which an image which has been optically modulated by the liquid crystal panels 302 or 305 is projected upon a mirror or a half mirror to be viewed by the user. In this case, the liquid crystal panels 302 or 305 are also provided on a main body 301 or 304, respectively. The optical system used in the present embodiment has the same functions as those in the prior art.

While transmission type active matrix liquid crystal panels are used as the liquid crystal panels 302 and 305 of the present embodiment, reflection type active matrix liquid crystal panels may be used instead.

Further, an optical system (concave half mirror or the like) may be provided in the main body 201 to increase the size of an image for virtual display. In this case, diffusers (diffusing plates) are preferably provided in front of the liquid crystal panels to eliminate roughness from a magnified image. It is possible to employ a configuration including a back light, a configuration having a function of adjusting the eye gap and a configuration in which an acoustic device is incorporated in the main body 301 or 304.

The liquid crystal panels described in the present embodiment have a configuration including color filters for forming a color image on an RGB (red, green and blue) basis. The primary colors required for color display are not limited to them, and appropriate colors may be set.

A configuration may also be employed in which red (R), green (G) and blue (B) light emitting diodes are used as back lights incorporated in the main body 301 or 304 to provide color images. In this case, each of the R, G and B light emitting diodes is blinked such that they are repeated in a sequence of R, G, B, R, G, B, R, in a time series at a frequency which is three times the writing period for one screen (frame frequency), which causes human eyes to recognize a color image. In this case, since no color filter is needed, bright display can be achieved.

Figure 4:
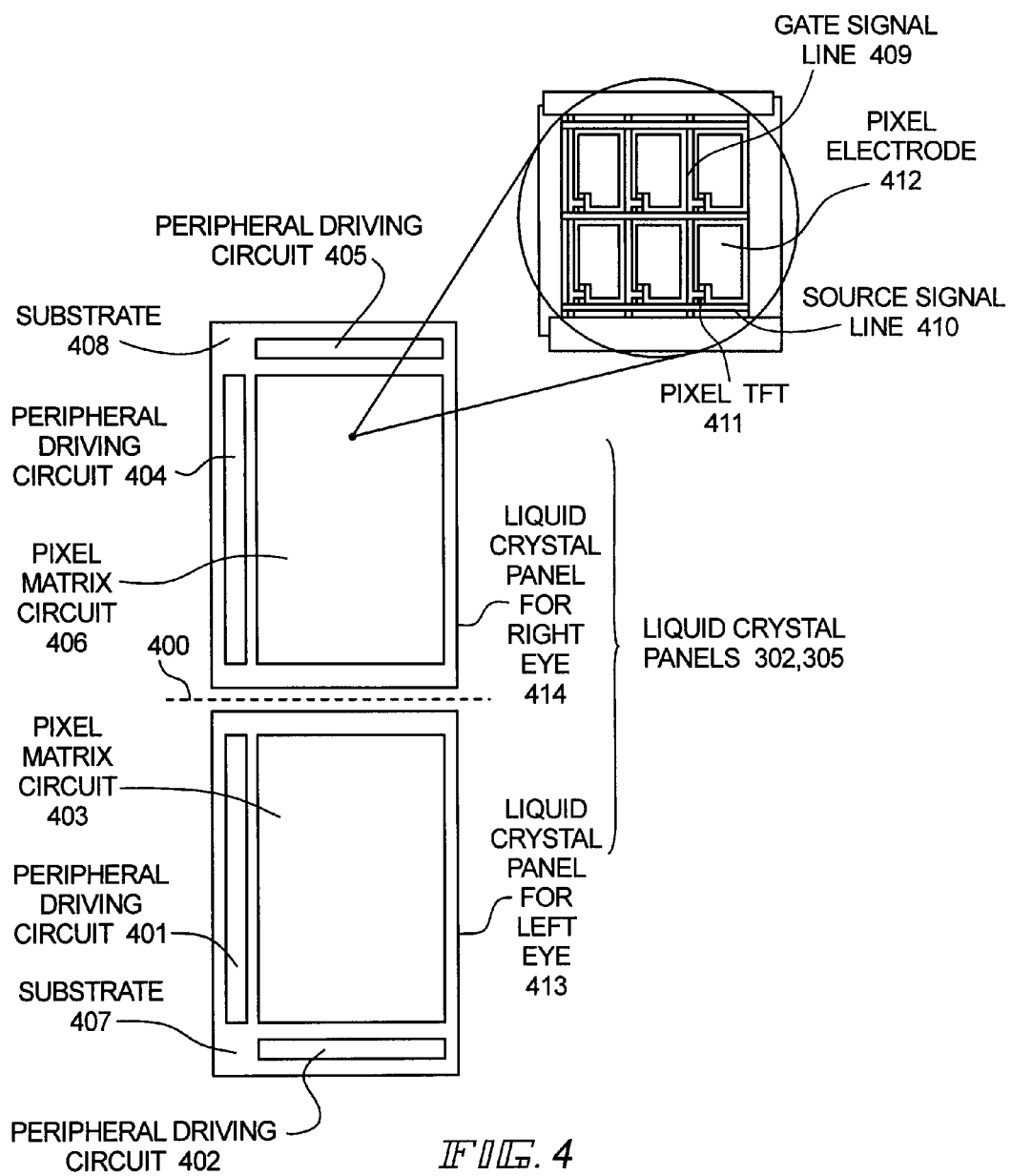
FIG. 4 is a schematic view of a liquid crystal panel incorporated in a head mount display used in an information processing apparatus according to the present invention.

In the configuration described in the present embodiment, the structure of the two liquid crystal display panels indicated by 302 or 305, especially the structure associated with the arrangement of pixels is as shown in FIG. 4. The size of the pixels is preferably in the range from 4 μm×4 μm to 45 μm×30 μm. In the present embodiment, the pixel size is 28 μm×28 μm. The pixels in active matrix regions 403 and 406 are preferably defined such that they occupy a small area to improve the numerical aperture.

In FIG. 4, 407 designates a substrate (glass substrate or quartz substrate) for the liquid crystal panel for the left eye. Peripheral driving circuits 401 and 402 are provided on the substrate 407. Further, the pixel matrix region (active matrix region) 403 is provided.

408 designates a substrate (glass substrate or quartz substrate) for the liquid crystal panel for the right eye. Peripheral driving circuits 404 and 405 are provided on the substrate 408. Further, the pixel matrix region (active matrix region) 406 is provided.

The two liquid crystal panels 413 (for the left eye) and 414 (for the right eye) correspond to the liquid crystal panels 302 and 305 in FIGS. 3A and 3B.

In the active matrix region, gate signal lines (scan lines) 409 and source signal lines 410 are provided in the form of a grid, and pixel TFTs 411 are provided in the vicinity of intersections thereof. A structure is employed in which a pixel TFT 411 controls the amount of charge maintained at a pixel electrode 412 to control the intensity of light transmitted through the liquid crystal layer, thereby providing an image on the liquid crystal panel as a whole in combination with other pixels.

The peripheral driving circuits of the left and right liquid crystal displays are arranged in line symmetry about an axis 400 extending therebetween. In general, the axis 400 substantially coincides with a line which vertically extends in the middle of the face of a user to divide it in two.

This makes it possible to establish symmetry between the apparent structure of the right-hand side liquid crystal panel as viewed by the right eye and the apparent structure of the left-hand side liquid crystal panel as viewed by the left eye. It is also possible to arrange the liquid crystal panels in symmetry about an axis of symmetry 300.

This is important in maintaining the balance of the structure. This is important especially in a head mount display in which the liquid crystal panels are located close to the eyes of a user.

Figure 5:
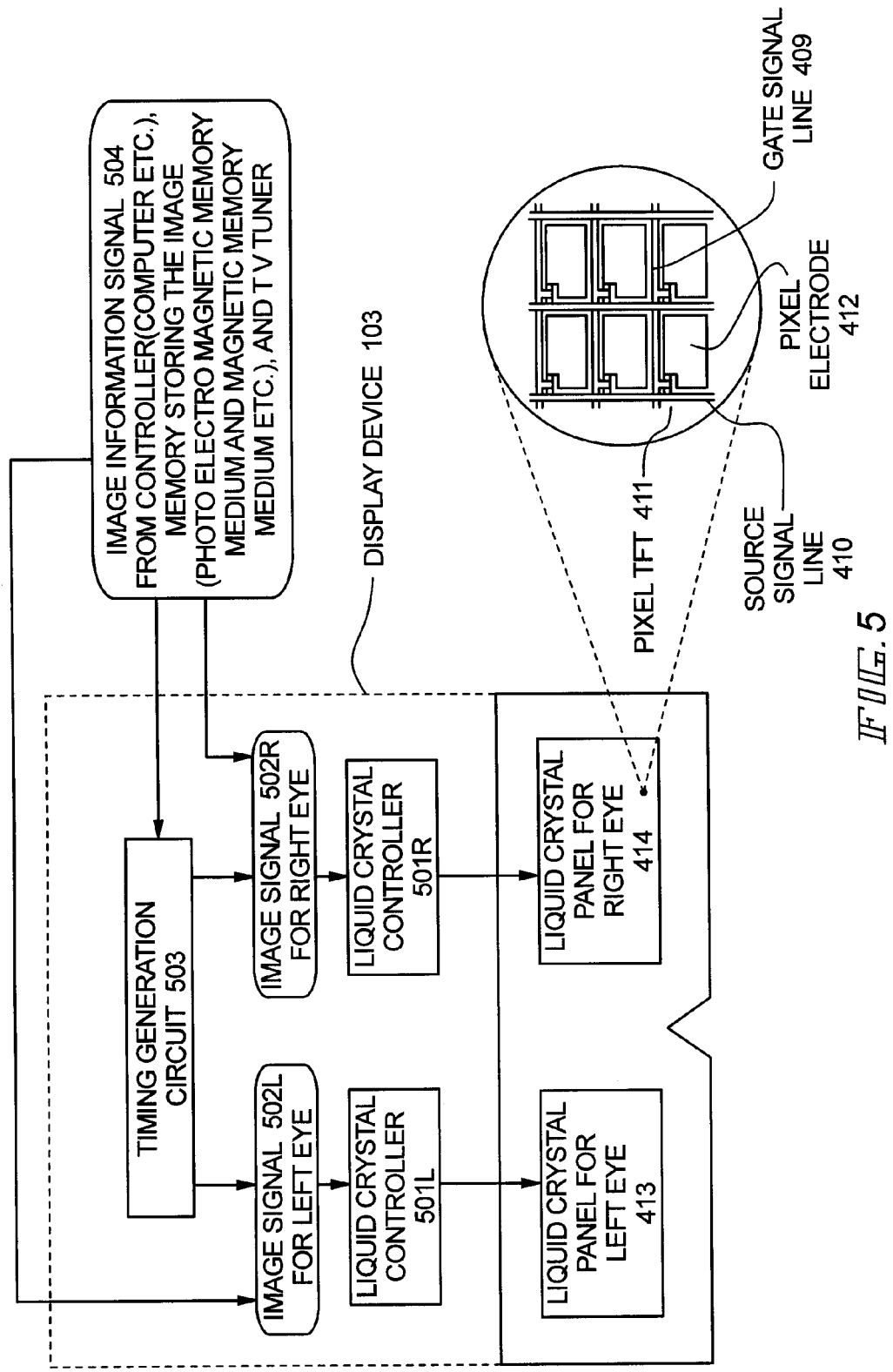
FIG. 5 illustrates a circuit configuration of a liquid crystal panel incorporated in a head mount display used in an information processing apparatus according to the present invention.

FIG. 5 shows an example of an internal block diagram of the display device 103. The display device 103 includes liquid crystal controllers 501L and 501R, a timing generation circuit 503 and the like.

The timing generation circuit 503 forms a synchronization signal such as a clock signal for adjusting the timing of display. In the present embodiment, an external device (controller or the like) performs a process of separating the signal into two to form signals for the left and right liquid crystal panels 413 and 414. The liquid crystal controllers 501L and 501R primarily performs a process of converting signals from the outside (a controller (a computer or the like) and image information signals from a storage device (an magneto-optical storage medium, magnetic storage medium or the like) that stores images, a television tuner and the like into signals which can be displayed on the left and right liquid crystal panels 413 and 414. The order of the signal processing in the display device 103 may be appropriately changed depending on the circuit design.

A lighter weight and a higher level of integration can be achieved by forming the liquid crystal controllers 501L and 501R and the timing generation circuit 503 on the same substrate as peripheral circuits of the liquid crystal panels.

A configuration may also be employed in which the display device 103 has a function of shutting out information on the state of the environment and a function of displaying virtual screens in an overlapping relationship with the surrounding scenery. A user can concentrate on virtual display screens by shutting out the state of the environment during an information processing operation. He or she can relax because of isolation from the environment. Obviously, a configuration is preferred in which both of the above-described functions are provided along with a switching device that allows a user to freely switch them. Further, a configuration may be employed in which the display device is provided with a function of automatically switching in accordance with an image signal input thereto.

The method for image display in the present invention is the same for an image signal 502R for the right eye and an image signal 502L for the left eye because a 2D (two-dimensional) image is to be displayed.

The liquid crystal panels (the liquid crystal panel 414 for the right eye and the liquid crystal panel 413 for the left eye) used in the display device 103 according to the invention performs line sequential scanning of the pixel TFTs, and the number of the pixels is so enormous as to be compatible with ATVs (advanced televisions) in the future. Therefore, they have resolution equal to or higher than that in the XGA mode, e.g., 1920 (horizontal)×1280 (vertical). The display device used in the information processing apparatus according to the invention is not limited to this resolution.

The display device 103 of the invention is driven using frame inversion driving wherein the positive and negative polarities of a voltage applied to all pixels are inverted for each frame (screen) at a frequency band (about 60 Hz or more) which is invisible to human eyes even if the distance between the liquid crystal panels 413 and 414 and the eyes is as small as a few centimeters. In the present embodiment, the positive and negative polarities of a voltage applied to all pixels are inverted for each frame (screen) at a frequency of 60 Hz. Alternatively, it may be driven using source line inversion driving wherein the positive and negative polarities of a voltage applied to pixels are inverted for each source line.

A description will now be described on an example of a method for fabricating the liquid crystal panels used in the information processing apparatus of the present embodiment. The method for fabricating liquid crystal panels described below is merely an example and the method for fabricating the liquid crystal panels used in the information processing apparatus of the present embodiment is not limited thereto.

Figure 13A:
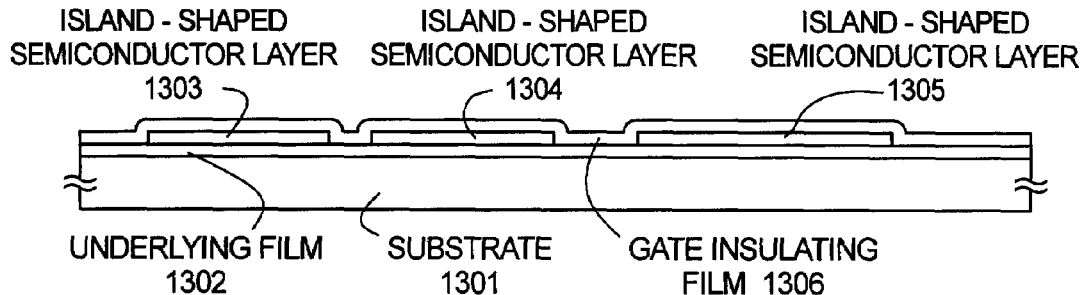
FIGS. 13A through 13D show an example of steps for fabricating a liquid crystal panel incorporated in a head mount display used in an information processing apparatus according to the present invention.
Figure 13B:
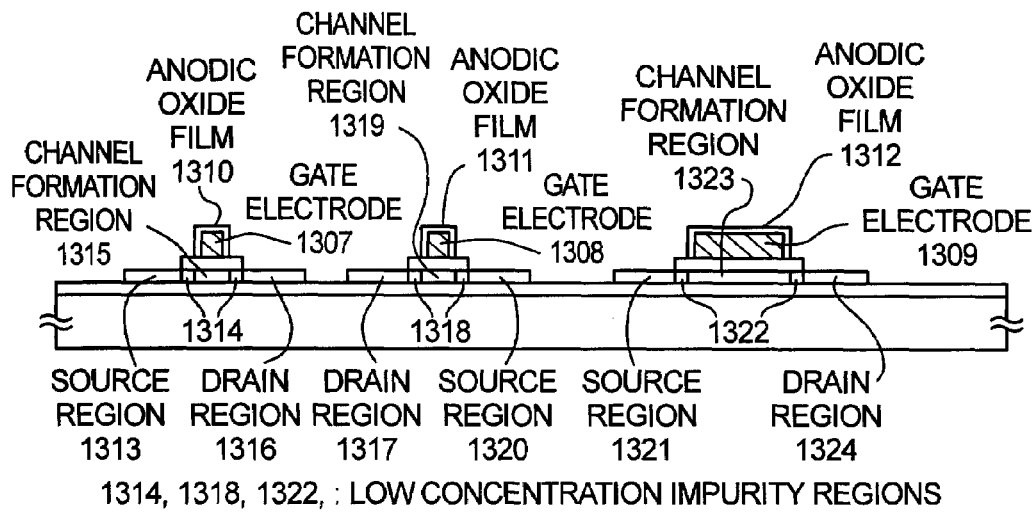

The present embodiment refers to an example of a method for integrating an active matrix region and peripheral driving circuits on one glass substrate or quartz substrate and fabricating a liquid crystal panel with reference to FIGS. 13A and 13B.

As shown in FIG. 13A, a silicon oxide film 1302 as an underlying film is formed on an insulating substrate 1301 to a thickness of 3000 Å using a sputtering process.

Next, an amorphous silicon film (not shown) is formed to a thickness of 400 Å using a low pressure thermal CVD process. Further, this amorphous silicon film is crystallized to obtain a crystalline silicon film referred to as "continuous grain silicon (CGS)". A method for fabricating CGS will be described later. The crystalline silicon film is patterned to form the island-shaped semiconductor layers indicated by 1303, 1304 and 1305 in FIG. 13A.

The island-shaped semiconductor layers become the active layers of thin film transistors. The region indicated by 1303 becomes the active layer of an NMOS (N-channel type thin film MOS transistor) that forms a part of a CMOS circuit in a peripheral driving circuit.

The region indicated by 1304 becomes the active layer of a PMOS (P-channel type thin film MOS transistor) that forms a part of a CMOS circuit in a peripheral driving circuit.

The region indicated by 1305 become the active layer of an NMOS (N-channel type thin film MOS transistor) provided at a pixel.

The state shown in FIG. 13A is thus achieved. A pattern of a gate electrode is formed from aluminum.

First, a aluminum film including 0.18 percent by weight of scandium is formed to a thickness of 4000 Å using a sputtering process. Scandium is included here in order to prevent the formation of protrusions such as hillocks and whiskers attributable to abnormal growth of aluminum at a subsequent step.

After the aluminum film is formed, an anodic oxide film having dense film quality (not shown) is formed on the surface thereof to a thickness on the order of 100 Å.

The electrolytic solution used here is an ethylene glycol solution including 3% tartaric acid neutralized by ammonia water. An anodic oxide film can be formed on the surface of the aluminum film by applying a current between platinum as a cathode and aluminum as an anode in the electrolytic solution.

This anodic oxide film has dense and rigid film quality and has a function of improving adhesion between a resist mask to be formed later and the aluminum film. The thickness of the anodic oxide film can be generally controlled by a voltage applied thereto.

When the aluminum film (not shown) having an anodic oxide film (not shown) formed thereon is provided, a resist mask is formed on the surface thereof to perform patterning using the mask. As a result, gate electrode patterns indicated by 1307, 1308 and 1309 in FIG. 13B are provided.

When the gate electrode patterns indicated by 1307, 1308 and 1309 are provided, anodic oxide films are formed again. The anodic oxide films are also formed using an ethylene glycol solution including 3% tartaric acid neutralized with ammonia water.

Here, the thickness of the anodic oxide films 1310, 1311 and 1312 is 1000 Å. The anodic oxide films have a function of protecting the surface of the gate electrodes formed from aluminum electrically and physically.

Next, doping is carried out with impurities that provide a conductivity type using the gate electrodes and the anodic oxide films on the surface thereof as a mask. At this step, doping with P (phosphorus) and B (boron) is alternately and selectively carried out using a plasma doping process with resist masks applied selectively to form N-type regions 1313, 1316, 1321 and 1324. P-type regions 1317 and 1320 are also formed. 1314, 1318 and 1322 represent low-concentration impurity regions.

After the doping is completed, the impurities used for doping are irradiated with laser beams to activate the same and to anneal damage that has occurred during doping. 1313 represents the source region of an NMOS; 1316 represents the drain region of the NMOS; 1317 represents the drain region of a PMOS; and 1320 represents the source region of the PMOS. 1321 represents the drain region of an NMOS, and 1324 represents the source region of the NMOS. 1315, 1319 and 1323 represent the channel formation regions of the respective thin film transistors.

The state shown in FIG. 13B is thus achieved. Then, a silicon nitride film 1325 to constitute a layer insulation film is formed to a thickness of 2000 Å using a plasma CVD process (FIG. 13C).

Figure 13C:
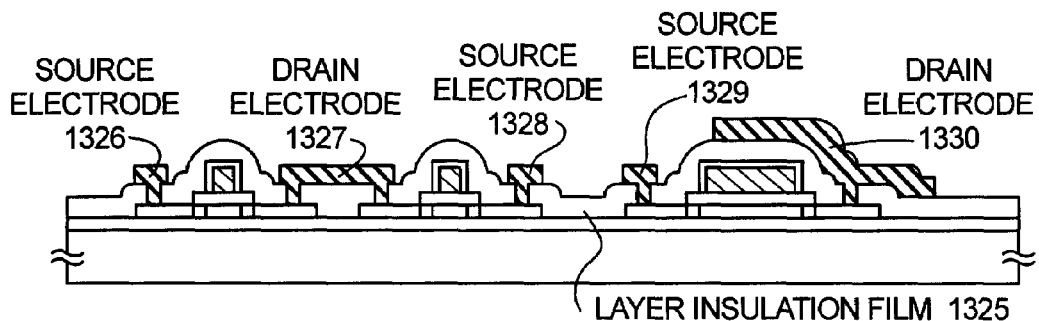

The state shown in FIG. 13C is thus realized. Then, contact holes are formed to form electrodes 1326 through 1330 constituted by multi-layer films comprising a titanium film, an aluminum film and another titanium film.

The thickness of the titanium films is 1000 Å, and the thickness of the aluminum film is 2000 Å. Each of the films is formed using a sputtering process.

At this point, a CMOS circuit that constitutes a peripheral driving circuit is formed.

Further, a spin coating process is performed to form a film 1331 made of polyimide resin that constitutes a first layer insulation film. Polyamide, polyimideamide, or the like may be used instead of polyimide resin. A resin material is used for the layer insulation film because it allows the surface to be planarized.

The state shown in FIG. 13C is thus realized. Next, a black matrix made of titanium is formed.

Next, a second layer insulation film 1333 made of polyimide resin is formed. Then, contact holes are formed to form pixel electrodes 1334 made of ITO.

Figure 13D:
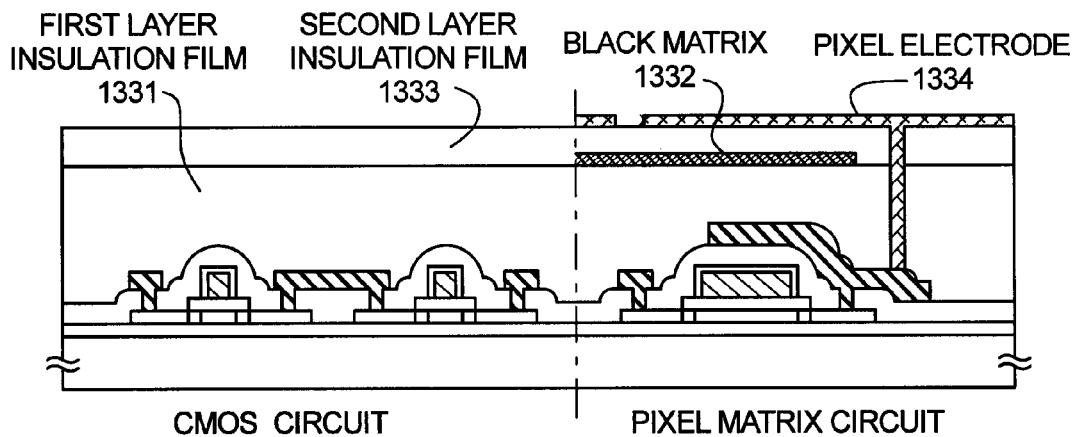

The state shown in FIG. 13D is thus realized. When the state shown in FIG. 13D is realized, a heating process is performed for one hour in a hydrogen atmosphere at 350° C. In this manner, a TFT is formed.

While the gate electrodes are formed from aluminum in the present embodiment, silicon may be used for the gate electrodes.

Figure 14:
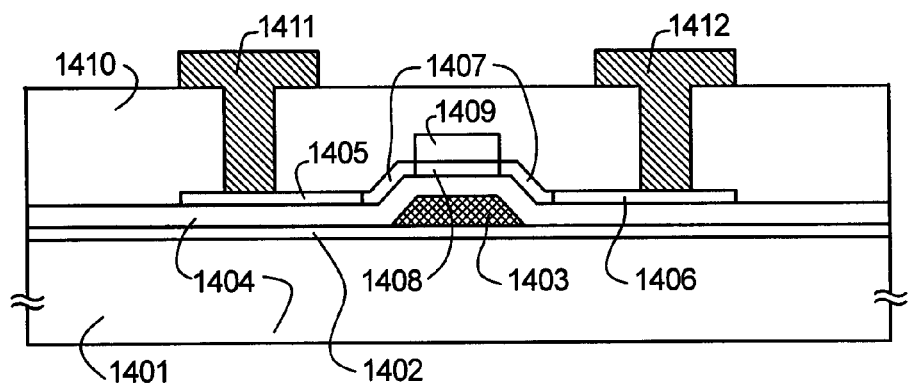
FIG. 14 shows an example of a structure of a liquid crystal display incorporated in a head mount display used in an information processing apparatus according to the present invention.

While the present embodiment has referred to an example of top-gate type TFTs, a configuration using bottom-gate type TFTs may be employed. FIG. 14 shows an example of a structure of a bottom-gate type TFT in which 1401 represents a substrate; 1402 represents an underlying film, 1403 represents a gate electrode; 1404 represents a gate insulation film; 1405 represents a source region; 1406 represents a drain region; 1407 represents an LDD region; 1408 represents a channel formation region; 1409 represents a channel protection film; 1410 represents a layer insulation film; 1411 represents a source electrode; and 1412 represents a drain electrode.

When a TFT is to have a bottom-gate type structure, the channel formation region 1408 is similarly formed using a continuous grain silicon film referred to as "CGS".

Figure 15:
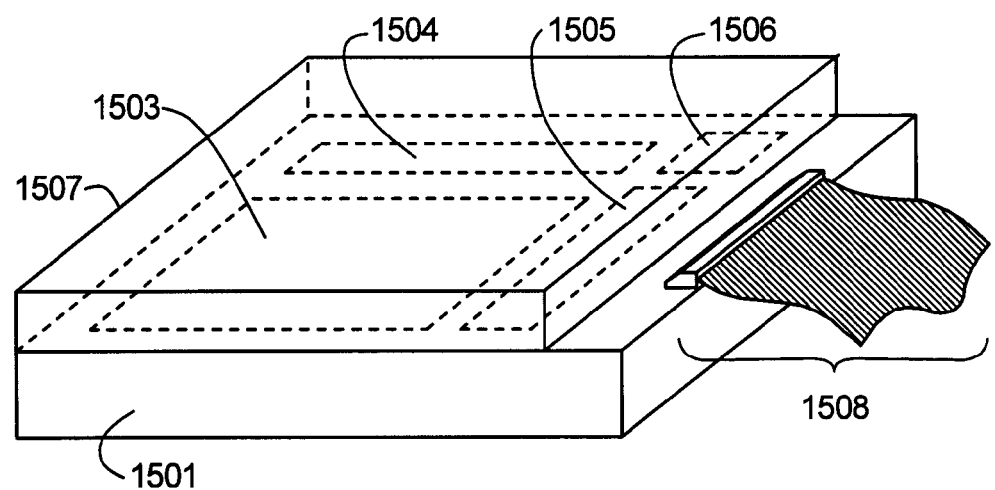
FIG. 15 is a perspective view of a liquid crystal panel incorporated in a head mount display used in an information processing apparatus according to the present invention.

Referring now to FIG. 15, a plurality of TFTs formed of CGS constitute a pixel matrix circuit 1503, a gate-side driving circuit 1504, a source-side driving circuit 1505 and a logic circuit 1506 (which are collectively referred to as "peripheral circuit" on the substrate. A counter substrate 1507 is put together with such an active matrix substrate. A liquid crystal layer (not shown) is sandwiched between the active matrix substrate and the counter substrate 1507.

In the configuration shown in FIG. 15, all side surfaces of the active matrix circuit and counter substrate are preferably aligned except one particular side. This makes it possible to increase the number of parts obtained from a large substrate efficiently. At one side as described above, a part of the counter substrate is removed to expose a part of the active matrix substrate where an FPC (flexible printed circuit) 1508 is mounted. An IC chip (a semiconductor circuit constituted by MOSFETs formed on single crystal silicon) may be loaded in this region as needed.

Since a TFT whose active region is CGS has a very high operating speed, it is possible to form a signal processing circuit for driving at a high frequency in the range from several hundred MHz to several GHz integrally with a pixel matrix circuit on the same substrate. That is, the liquid crystal panel shown in FIG. 15 is specific form of a system on panel.

The present invention may be applied not only to liquid crystal display devices integrated with driving circuits but also to the so-called external type display device in which driving circuits are formed on a substrate different from that for the liquid crystal panel.

While the present embodiment discloses an application of the present invention to a liquid crystal display device, it is possible to configure an active matrix EL (electro-luminescence) display device or the like. It is also possible to form an image sensor having a photoelectric conversion layer or the like on the same substrate.

[Method for Fabricating CGS and Structure of the Same]

A description will now be made with reference to FIGS. 8 through 10 on a method for fabricating "continuous grain silicon (CGS)" used for the present invention and a structure of the same.

[Steps for Fabricating CGS]

First, an amorphous semiconductor thin film is formed on an insulating substrate using a low pressure CVD process, plasma CVD process or sputtering process.

Typically, an amorphous silicon film may be used as the amorphous semiconductor thin film. A compound of silicon and germanium expressed by $Si_{y}Ge_{1-x}$ (0<X<1) may be used as the semiconductor thin film. The thickness of the amorphous semiconductor thin film is in the range from 25 to 100 nm (preferably in the range from 30 to 60 nm).

It is preferable to reduce impurities such as carbon, oxygen and nitrogen mixed in the film thoroughly because they can hinder subsequent crystallization. Specifically, the concentration of both of carbon and nitrogen is preferably $5 \times 10^{18}$ atoms/cm$^3$ or less (typically, less than $5 \times 10^{17}$ atoms/cm$^3$), and the concentration of oxygen is preferably $1.5 \times 10^{19}$ atoms/cm$^3$ or less (typically, less than $1 \times 10^{18}$ atoms/cm$^3$). By keeping the concentrations within the above-described ranges during the formation of the film, the impurity concentration of finished TFTs can be also kept within the above ranges.

It is advantageous to add an impurity element (an element selected from the column III which is typically boron or an element selected from the column V which is typically phosphorus) to control the threshold voltage (Vth) of the TFTs during the formation of the film. The dose must be determined in consideration to the threshold voltage Vth which is achieved without the above-described impurity for controlling the threshold voltage Vth.

Next, a step of crystallizing the amorphous semiconductor thin film is carried out. The techniques disclosed by the inventors in Japanese unexamined patent publication No. H7-130652 is used as the means for crystallization. While either of the means disclosed in the first and second embodiments in the same publication may be used, it is preferable to use the technique disclosed in the second embodiment (detailed in Japanese unexamined patent publication No. H8-78329) for the present invention.

According to the technique disclosed in Japanese unexamined patent publication No. H8-78329, a mask insulation film is formed first to select regions to be doped with a catalytic element. A solution including the catalytic element for promoting the crystallization of the amorphous semiconductor thin film is applied using a spin coating process to form a layer including the catalytic element.

The catalytic element used may be one element or a plurality of element selected from among nickel (Ni), cobalt (Co), iron (Fe), palladium (Pd), platinum (Pt), copper (Cu), gold (Au), germanium (Ge) and lead (Pb). It is especially preferred to use nickel which is excellent in lattice matching with silicon.

The above-described step of adding a catalytic element is not limited to a spin coating process, and an ion implantation process or plasma doping process utilizing a mask may be used. This technique will be effective in forming fine circuits because it facilitates reduction of the area occupied by the doped regions and control over the growing distance of laterally grown regions.

When the step of adding a catalytic element is completed, hydrogen purging is carried out for about two hours at 500° C. and, thereafter, a heating process is carried out at a temperature in the range from 500° C. to 700° C. (typically in the range from 550° C. to 650° C. and preferably at 570° C.) in a hydrogen atmosphere or oxygen atmosphere to crystallize the amorphous semiconductor thin film.

At this point, the crystallization of the amorphous semiconductor thin film proceeds from nuclei generated in the regions doped with the catalytic element in precedence to other regions to form crystalline regions which are grown substantially in parallel with the surface of the substrate. The inventors refer to such crystalline regions as "laterally grown regions". A laterally grown region is advantageous in that it has high crystallinity as a whole because individual crystals are concentrated at a relatively high level of alignment with each other.

When the heating process for crystallization is completed, a heating process is carried out after removing the mask insulation film to eliminating the catalytic element (a process of gettering the catalytic element). This heating process is to introduce a halogen element in the processing atmosphere to utilize an effect of gettering metal elements exhibited by a halogen element.

In order to utilize the gettering effect of the halogen element sufficiently, the above-described processing temperature is preferably increased above 700° C. The gettering effect may not be demonstrated at a lower temperature because of difficulty in decomposition of halogenides in the processing atmosphere. For this reason, it is preferred that the temperature for the heating process is kept in the range from 800 to 1000° C. (typically at 950° C.) and that the processing time is in the range from 0.1 to 6 hours and typically in the range from 0.5 to 1 hour.

Typically, a heating process may be performed for 30 minutes at 950° C. in an oxygen atmosphere including hydrogen chloride (HCl) at a concentration in the range from 0.5 to 10% by volume (preferably 3% by volume). An HCl concentration higher than the above-described concentration is not preferable because it results in irregularities having a thickness on the order of the film thickness on the surface of a laterally grown region.

Referring to the compound including a halogen element, in addition to HCl gas, it is possible to use one or a plural kinds of compounds selected from among compounds including a halogen element such as HF, $NF_3$, HBr, $Cl_2$, $ClF_3$, $BCl_3$, $F_2$ and $Br_2$.

At this step, a catalytic element in a laterally grown region is gettered by the action of chlorine and escapes as a volatile chloride into the air to be removed. After this step, the concentration of the catalytic element in the laterally grown region is reduced to $5 \times 10^{17}$ atoms/cm$^3$ or less (typically $2 \times 10^{17}$ atoms/cm$^3$ or less).

A laterally grown region thus obtained has a unique crystal structure formed by a collection of bar-shaped or planar bar shaped crystals. The characteristics of the same will be described below.

[Findings on the Crystal Structure of a Laterally Grown Region]

A laterally grown region formed with the above-described steps of fabrication has a crystal structure in which a plurality of bar-shaped (or planar bar-shaped) crystals are regularly arranged in a predetermined direction substantially in parallel with each other when viewed microscopically. This can be easily conformed through observation using TEM (transmission type electronic microscopy).

Figure 16:
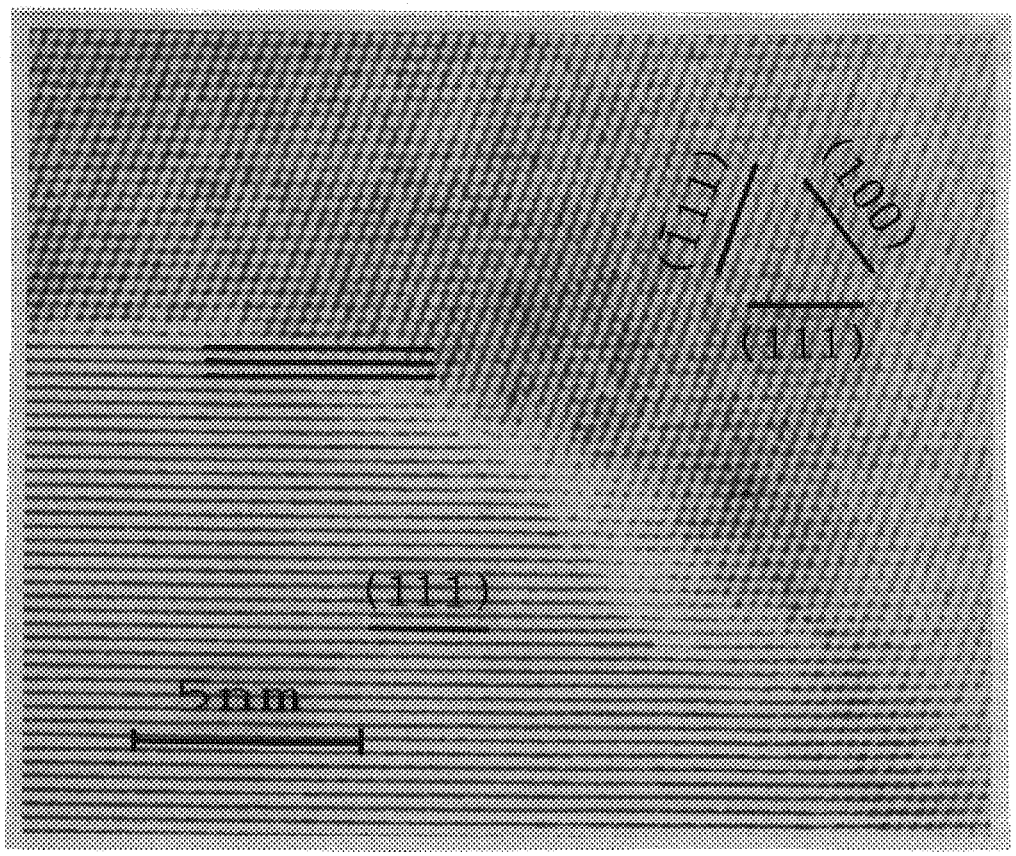
FIG. 16 shows a TEM photograph of CGS.

The inventors have closely observed the grain boundary of a semiconductor thin film obtained according to the above-described method of fabrication using HR-TEM (high resolution transmission type electronic microscopy) (see FIG. 16). In the context of the present specification, it is defined that the term "grain boundary" means a grain boundary formed at a boundary where different bar-shaped crystals contact each other unless otherwise specified. It is therefore regarded different from a boundary in a macroscopic sense of the word which is formed as a result of, for example, collision between separate laterally grown regions.

The above-described HR-TEM (high resolution transmission type electronic microscopy) is a technique wherein electron beams are vertically applied to a sample and the arrangement of the atoms and molecules is evaluated based on electrons transmitted therethrough or the interference of elastically scattered electrons. The use of this technique makes it possible to observe the arrangement of crystal lattices as lattice fringes. Thus, the observation of a grain boundary makes it possible to assume the state of atom bonding at the grain boundary.

A TEM photograph taken by the inventors (FIG. 16) allowed clear observation of a state in which two different crystal grains (bar-shaped crystal grains) contacted with each other at a grain boundary. Further, it has been recognized from the diffraction of electron beams that the two crystal grains were oriented substantially in a {110} direction with a slight offset between the crystal axes thereof.

On the above-described TEM photograph, a lattice fringe corresponding to a {111} plane was observed in the {110} plane. A lattice fringe corresponding to the {111} plane is a lattice fringe where the {111} plane appears when the crystal grain is cut along the lattice fringe. An easy way to know to what kinds of planes lattice fringes correspond is to know the distance between the lattice fringes.

The inventors found a very interesting fact as a result of close observation on a TEM photograph taken on a semiconductor thin film obtained using the above-described method of fabrication. Lattice fringes corresponding to the {111} plane were seen on both of two different crystal grains seen on the photograph. It was observed that those lattice fringes extended obviously in parallel with each other.

Further, lattice fringes of two different crystal grains that were continuous to each other as if they extended across a grain boundary therebetween regardless of a grain boundary existed or not. In other words, it was observed that most of lattice fringes that seemed as if they extended across a grain boundary were in linear continuity in spite of the fact that they were lattice fringes of different crystal grains. This was the same for any grain boundary.

Such a crystal structure (exactly, the structure of a grain boundary) shows that two different crystal grains are bonded at a very high level of alignment at a grain boundary. That is, it is a configuration in which crystal lattices are arranged continuously at a grain boundary and in which there is a very small possibility of the formation of a trap level attributable to a crystal defect or the like. In other words, crystal lattices are continuous at a grain boundary.

Figure 17:
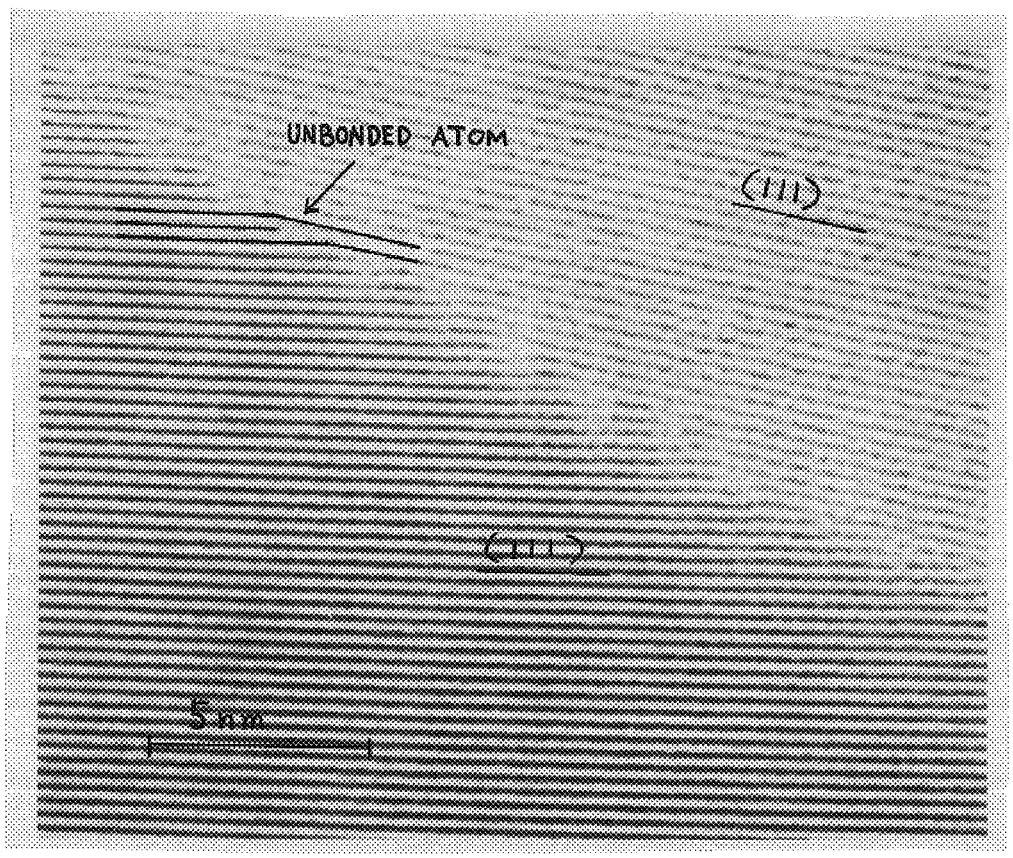
FIG. 17 shows a TEM photograph of high temperature polysilicon.

Referring to FIG. 17, the inventor also analyzed a conventional polycrystalline silicon film (a so-called high temperature polysilicon film) as a reference based on observation utilizing electron beam diffraction and HR-TEM. As a result, crystal fringes in two different crystal grains extended completely differently from each other and substantially no bonding between crystal grains where lattice fringes were continuous at a high level of alignment. That is, it was revealed that lattice fringes are discontinuous in many places at a grain boundary, which results in many crystal defects.

According to the inventors, a state of atomic bond in which lattice fringes are associated with each other at a high level of alignment as seen in a semiconductor thin film used in a liquid crystal panel of an information processing apparatus of the invention is referred to as "matched bond", and bonding hands at that time are referred to as "matched bonding hands". Conversely, a state of atomic bonding in which lattice fringes are not associated with each other at a high level of alignment as frequently seen in conventional polycrystalline silicon films is referred to as "unmatched bond", and bonding hands at that time are referred to as "unmatched bonding hands (or unpaired bonding hands)".

A semiconductor thin film used in the present invention has a very small number of unmatched bonding hands as described above because it exhibits a very high level of alignment at grain boundaries. An observation of a plurality of grain boundaries conducted by the inventors revealed that the ratio of unmatched bonding hands to the entire bonding hands was 10% or less (preferably 5% or less and more preferably 3% or less). That is, 90% or more (preferably 95% or more and more preferably 97% or more) of the bonding hands are matched bonding hands.

Figure 18A:
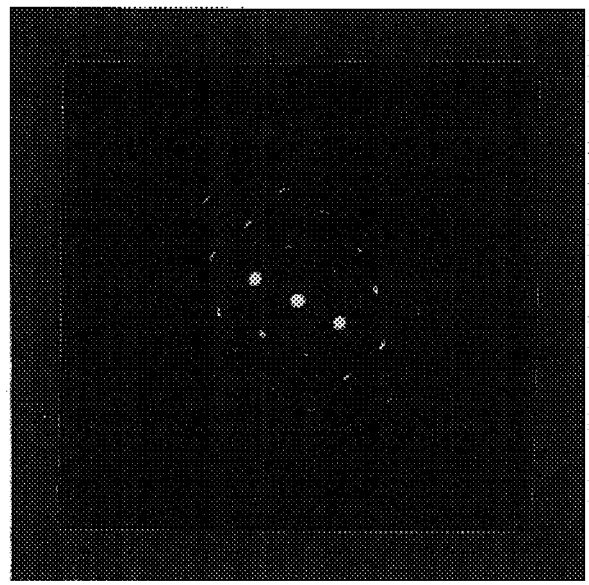
FIGS. 18A and 18B show electron beam diffraction patterns in CGS and high temperature polysilicon, respectively.
Figure 18B:
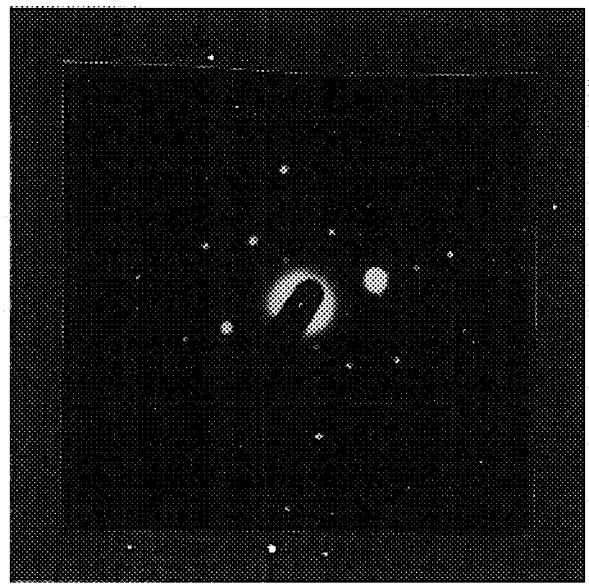

FIG. 18A shows the result of observation based on electron beam diffraction made on a laterally grown region fabricated with the above-described steps. FIG. 18B shows an electron beam diffraction pattern of a conventional polysilicon film (which is referred to as "high temperature polysilicon film) observed for comparison.

The electron beam diffraction patterns shown in FIGS. 18A and 18B resulted from areas irradiated with electron beams having a diameter of 4.25 µm, and information was collected from sufficiently large areas. The photographs shown here are typical diffraction patterns obtained as a result of an examination on a plurality of arbitrary points.

FIG. 18A relatively clearly shows diffraction spots (diffraction stigmata) associated with <110> incidence and proves that substantially all crystal grains in the area irradiated with electron beams are aligned in the {110}-direction. In the case of the conventional high temperature polysilicon film shown in FIG. 18B, no regularity was seen on the diffraction spots, and it was revealed that crystal grains orientated in planes other than the {110}-plane were included with irregularity.

Thus, the semiconductor thin film used in the present invention is characterized in that it exhibits an electron beam diffraction pattern having regularity unique to {110}-orientation in spite of the fact that it is a semiconductor thin film having grain boundaries and is clearly distinguished from conventional semiconductor thin films when compared thereto with respect to electron beam diffraction patterns.

As described above, the semiconductor thin film fabricated with the above-described fabrication steps was a semiconductor thin film having a crystal structure (exactly speaking, a structure of grain boundaries) completely different from those of conventional semiconductor thin films. The inventors have described the results of analysis on a semiconductor thin film used in the present invention in Japanese patent applications No. H9-55633, No. H9-165216 and No. H9-212428.

Grain boundaries in a semiconductor thin film used in the present invention as described above substantially have no function of a barrier for blocking carrier movement because 90% or more of the same are constituted by a matched bonding hand. That is, a semiconductor thin film used in the present invention may be substantially regarded as having no grain boundary.

While grain boundaries have acted as barriers to block carrier movement in conventional semiconductor thin films, high carrier mobility can be achieved in a semiconductor thin film used in the present invention because there is substantially no grain boundary as described above. Therefore, a TFT fabricated using a semiconductor thin film according to the invention has excellent electrical characteristics, which will be described later.

[Findings on TFT Electrical Characteristics]

Since a semiconductor thin film used in the present invention may be substantially regarded as a single crystal (no grain boundary substantially exists), a TFT utilizing the same as the active layer has electrical characteristics comparative to those of a MOSFET utilizing single crystal silicon. The following data was obtained from TFTs prototyped by the inventors.

(1) Referring to subthreshold coefficients to serve as indices of the switching performance of TFTs (quickness in switching between on/off operations), both of an n-channel type TFT and a p-channel type TFT had a small coefficient in the range from 60 to 100 mV/decade (typically in the range from 60 to 85 mV/decade).

(2) Referring to field effect mobility (PFE) to serve as an index of the operation speed of TFTs, the n-channel type TFT and p-channel TFT exhibited great values in the range from 200 to 650 $cm^2/V_s$ (typically in the range from 250 to 300 $cm^2/V_s$) and in the range from 100 to 300 $cm/V_s$ (typically in the range from 150 to 200 $cm^2/V_s$), respectively.

(3) Referring to threshold voltages (Vth) to serve as indices of the driving voltage of TFTs, the n-channel type TFT and p-channel type TFT had small values in the range from −0.5 to 1.5 V and in the range from −1.5 to 0.5 V, respectively.

As described above, it was confirmed that quite excellent switching characteristics and high speed operation characteristics can be achieved.

During the formation of CGS, the above-described annealing step at a temperature (in the range from 700 to 1100° C.) equal to or higher than the crystallization temperature plays an important roll in reducing defects in a crystal grain, which will be described below.

Figure 19A:
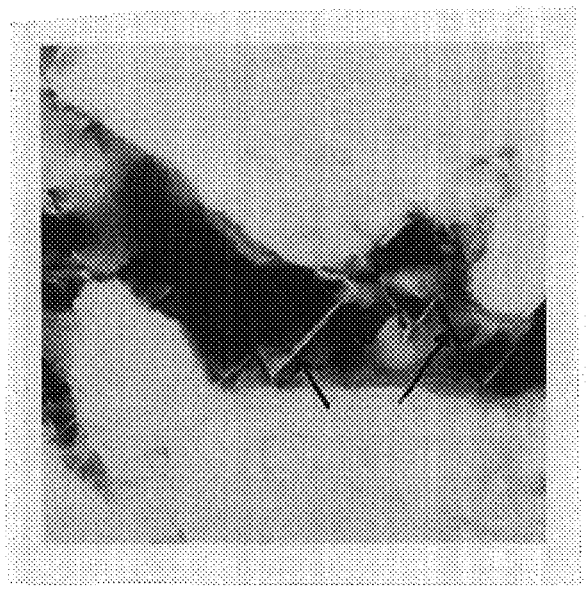
FIGS. 19A and 19B show TEM photographs of CGS and high temperature polysilicon, respectively.

FIG. 19A is a TEM photograph at a magnification of 250,000 showing a crystalline silicon film at a point in time at until when steps up to the above-described crystallization step have been completed. A defect that appears zigzag can be seen in the crystal grain (the black and white regions appear as a result of a difference in contrast) as indicated by the arrow.

While such a defect is primarily a stacking fault which is an error in the order of atoms stacked on a silicon crystal lattice plane, it may be dislocation or the like. It seems that FIG. 19A shows a stacking defect in which a defective plane extends in parallel with the {111}-plane. This can be recognized from the fact that the zigzag defect is bent at an angle of about 70° C.

Figure 19B:
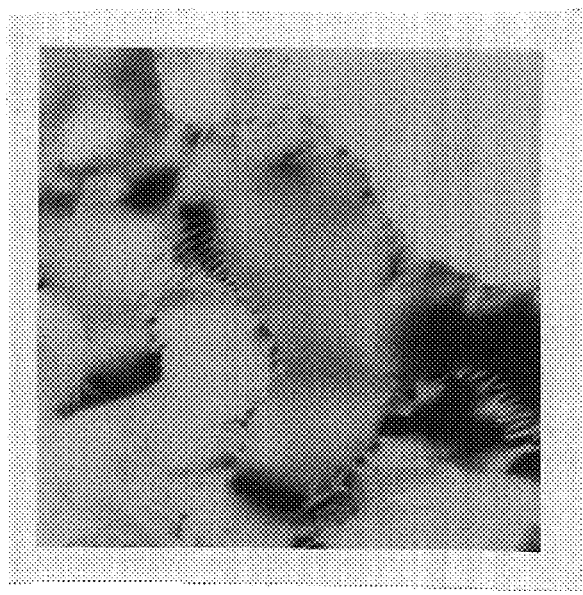
Figure 20:
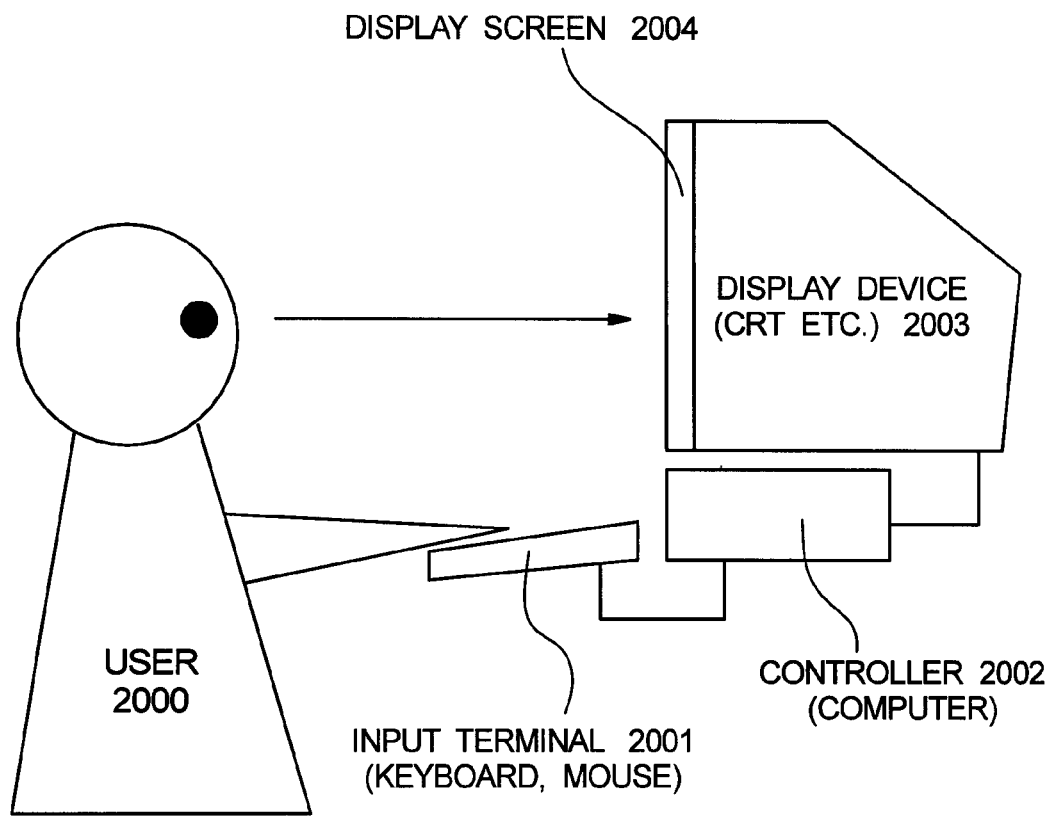
FIG. 20 is a schematic view of a conventional information processing apparatus.

Referring now to FIG. 19B, substantially no defect attributable to a stacking fault, dislocation or the like is found in a crystal grain of a crystalline silicon film used in the present invention viewed at the same magnification, and it can be recognized that there is very high crystallinity. This holds true throughout the film surface. Although it is currently difficult to eliminate defects completely, they can be reduced to a degree that can be substantially regarded zero.

That is, a crystalline silicon film used in a liquid crystal panel of an information processing apparatus may be regarded monocrystalline or substantially monocrystalline because defects in the crystal grains are reduced to a substantially negligible degree and the grain boundaries can not act as barriers against carrier movement thanking to high continuity between them.

Although both of the crystalline silicon films shown in the photographs in FIGS. 19A and 19B have substantially the same level of continuity at their grain boundaries, there is a big difference between them with respect to the number of defects in the crystal grains. Such a difference in the number of defects is the major reason for the fact that the crystalline silicon film shown in FIG. 19B has electrical characteristics much higher than those of the crystalline silicon film shown in FIG. 19A.

It is apparent from above that the process of gettering a catalytic element is an indispensable step in the fabrication of CGS. The inventors have contemplated a model as described below for phenomena caused by this step.

First, in the state shown in FIG. 19A, the catalytic element (which is typically nickel) has been segregated at the defect (which is primarily a stacking fault) in the crystal grain. Specifically, it is considered that there are many bonds such as Si—Ni—Si.

However, the process of gettering the catalytic element removes Ni present in the defect to break Si—Ni bonds. As a result, the redundant bonding hands of silicon immediately form Si—Si bonds to be stabilized. This eliminates the defect.

While it is of course known that thermal annealing at a high temperature eliminates defects in a crystalline silicon film, it can be assumed that the breakage of bonding with nickel produces a great number of uncombined hands to allow smooth recombination of silicon.

Further, the inventors have an idea of a model in which a heating process at a temperature (in the range from 700 to 1100° C.) equal to or higher than the crystallization temperature secures a crystalline silicon film to the base thereof to increase the degree of adhesion therebetween, thereby eliminating defects.

A crystalline silicon film (FIG. 19B) thus obtained is characterized in that it has defects in the crystal grains in a quantity much smaller than that of a crystalline silicon film which has been simply crystallized (FIG. 19A). The difference in the number of defects takes the form of a difference in spin density identified by an analysis on electron spin resonance (ESR).

Presently, the spin density of a crystalline silicon film used in the present invention is at least $1 \times 10^{18}$ pcs./cm³ or less (typically $5 \times 10^{17}$ pcs./cm³ or less).

A crystalline silicon film used in the present invention having the above-described crystal structure and characteristics is referred to as "continuous grain silicon (CGS)".

A second embodiment of the present invention will now be described.

The present embodiment refers to an example in which a display device (head mount display) is used to provide a virtual display of a 3D (three-dimensional) image. The present embodiment will be described referring again to FIG. 5. There is no particular limitation liquid crystal panels of the display device as long as they are liquid crystal panels which performs line sequential scan of pixel TFTs and which use A.C. drives (alternating drives) at a frequency band (in the range from about 30 Hz to about 180 Hz) invisible to human eyes.

As the 3D (three dimensional) images, there is provided two pieces of different image information, i.e., an image signal 502R for the right eye and an image signal 502L for the left eye. The present embodiment employs a configuration in which an external device (controller, storage device or the like) forms the two different image signals and inputs them to a liquid crystal panel 414 for the right eye and a liquid crystal panel 413 for the left eye to simplify the configuration of the display device.

When the two image signals 502R and 502L are obtained using two image pick-up devices to pick up a three-dimensional image, image information thus obtained may be directly used.

3D (three-dimensional) images can be obtained by respectively inputting the above-described two different image signals 502R and 502L to liquid crystal controllers 501R and 501L which form signals to be input to the liquid crystal panels for the right and left eyes, respectively. Specifically, the liquid crystal controllers 501R and 501L converts the image information signals 502R and 502L into signals that cause images displayed on the liquid crystal panels to be recognized by human eyes as 3D (three-dimensional) images. Obviously, the order of the processes on the signals in the main body 103 of the display device may be changed appropriately depending on the circuit design.

In addition, a configuration is preferred in which a select switch or the like is provided in the display device main body 103 to make it possible also to display 2D (two-dimensional) images.

The liquid crystal panels of the display device used in the information processing apparatus of the present embodiment can be also provided according to the method of fabrication described in the first embodiment.

A third embodiment of the present invention will now be described.

Figure 6:
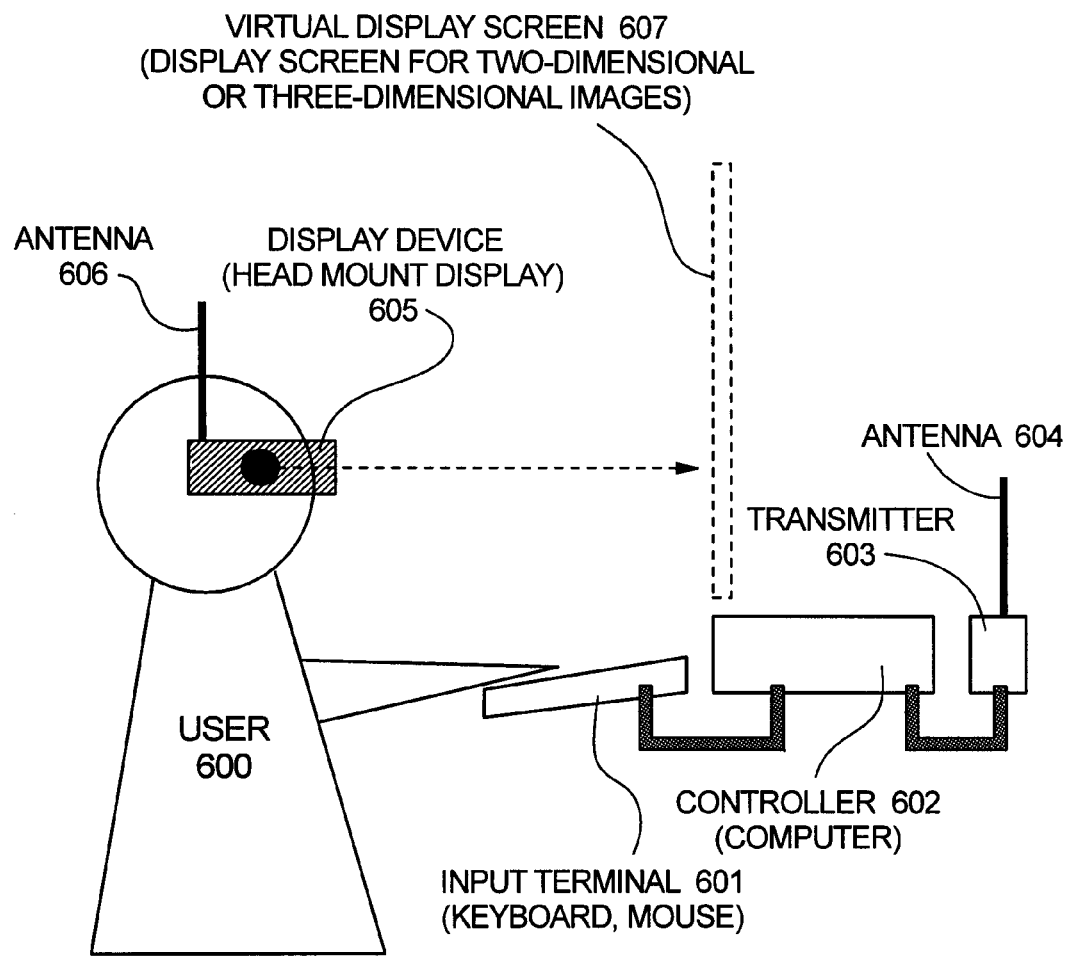
FIG. 6 is a schematic view of another embodiment of an information processing apparatus according to the present invention.

The present embodiment describes to another mode of carrying out the invention with reference to FIG. 6. FIG. 6 is a schematic view of an information processing apparatus of the present embodiment.

As shown in FIG. 6, the information processing apparatus of the present embodiment comprises an input terminal 601, a controller (a computer or the like) 602, a transmitter 603, a display device (HMD) 605 and the like. 607 designates a virtual display screen which is actually observed by a user 600. The controller 602 is electrically connected to the transmitter 603 which outputs image signals, information signals and the like from the controller 602 through an antenna 604 as electric waves. The output electric waves are received by an antenna 606 of the display device 605 to supply the image signals and information signals to the display device 605. Although not shown, the display device 605 incorporates a receiver. The internal structure of the display device is the same as that of the first embodiment.

In the information processing apparatus of the present embodiment, complicated wiring can be eliminated because the display device 605 and controller transmit and receive information on a cordless basis.

Liquid crystal panels of the display device used in the information processing apparatus of the present embodiment may be also provided according to the method of fabrication described in the first embodiment.

A fourth embodiment of the present invention will now be described.

Figure 7:
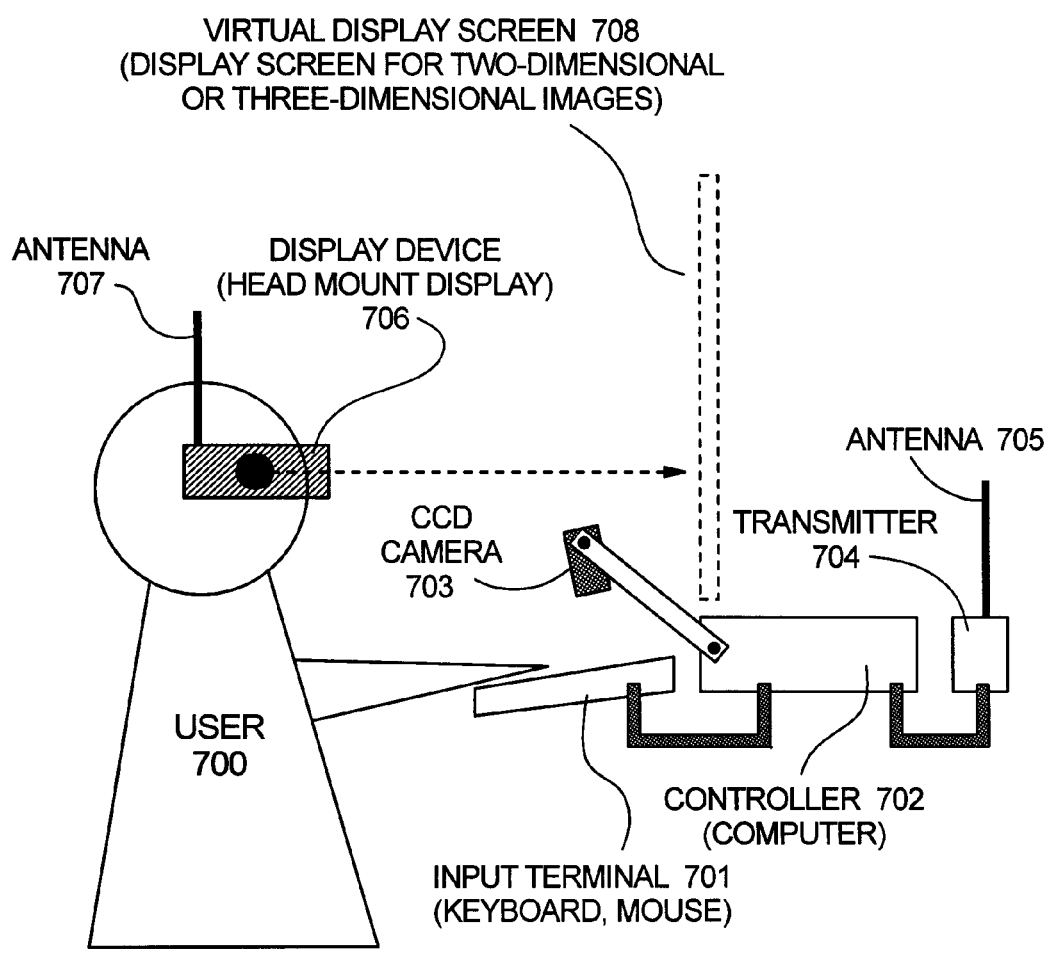
FIG. 7 is a schematic view of still another embodiment of an information processing apparatus according to the present invention.

The present embodiment describes to still another mode of carrying out the invention with reference to FIG. 7. FIG. 7 is a schematic view of an information processing apparatus of the present embodiment.

As shown in FIG. 7, the information processing apparatus of the present embodiment comprises an input terminal 701, a controller (a computer or the like) 702, a CCD camera 703, a transmitter 704, a display device (HMD) 706 and the like. While only one CCD camera is illustrated according to the present embodiment, a plurality of CCD cameras may be provided. The present invention is not limited to the CCD camera 703, and any image pick-up device may be employed.

708 designates a virtual display screen which is actually observed by a user 700. The controller 702 is electrically connected to the transmitter 704 which outputs image signals, information signals and the like from the controller 702 through an antenna 705 as electric waves. The output electric waves are received by an antenna 707 of the display device 706 to supply the image signals and information signals to the display device 706. Although not shown, the display device 706 incorporates a receiver. The internal structure of the display device is the same as that of the first embodiment.

The CCD camera 703 picks up images around a keyboard and a work desk and converts them into electric signals to supply information to the controller 702. The controller 702 performs image processing on the information from the CCD camera 703 and supplies the information along with other information to the display device 706 through the transmitter 704. In the present embodiment, the display device 706 and controller transmit and receive information on a cordless basis as in the third embodiment.

Figure 8:
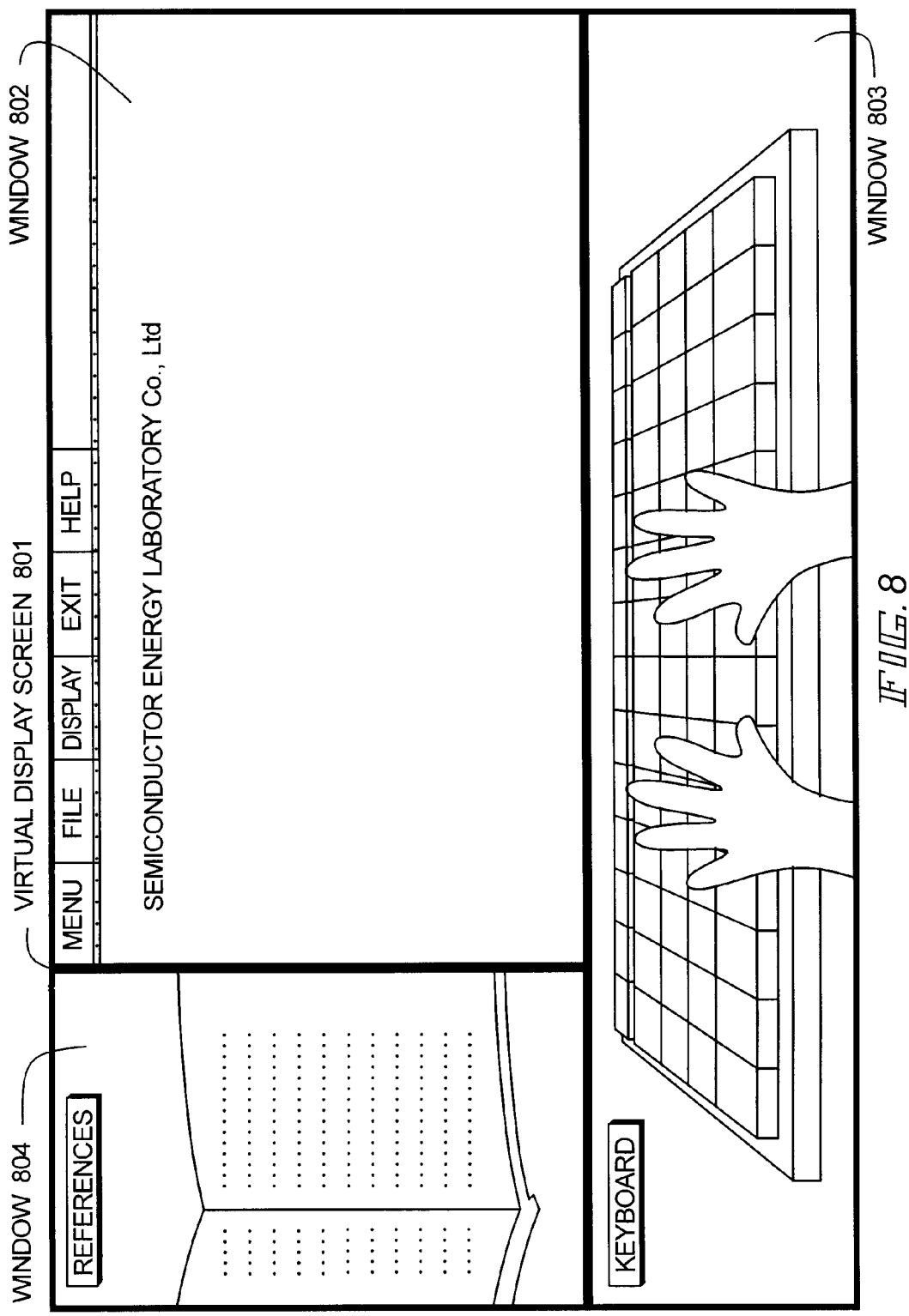
FIG. 8 illustrates a virtual display screen of an information processing apparatus according to the present invention.

Reference is now made to FIG. 8. FIG. 8 shows a virtual display screen 801. The virtual display screen 801 is capable of displaying a plurality of pieces of information at a time. In FIG. 8, a plurality of windows 802 through 804 are displayed. The window 802 displays a word processor screen; the window 803 displays an image of a keyboard picked up by the CCD camera 703; and the window 804 displays an image of a reference article or the like picked up by the CCD camera 703.

The image of a keyboard displayed in the window 803 may be an image picked up by the CCD camera 703 displayed without image processing thereon. Some kind of image processing may be performed to supply a clear image. Instead of information from the CCD camera, information may be provided using the keyboard as a touch sensor.

The image of a keyboard displayed in the window 803 may be drawn using computer graphics. In this case, image processing may be performed on an image of a hand of the user picked up by the CCD camera 703 to draw the user's hand on a computer graphics basis.

The image of a reference article displayed in the window 804 may be the image picked up by the CCD camera 703 displayed without image processing thereon. Some kind of image processing may be performed to supply a clear image. For example, when the user needs to recognize characters only, image processing may be performed on the image picked up by the CCD camera 703 to display only characters in the window 804.

Liquid crystal panels of the display device used in the information processing apparatus of the present embodiment may be also provided according to the method of fabrication described in the first embodiment.

A fifth embodiment of the present invention will now be described.

Figure 9:
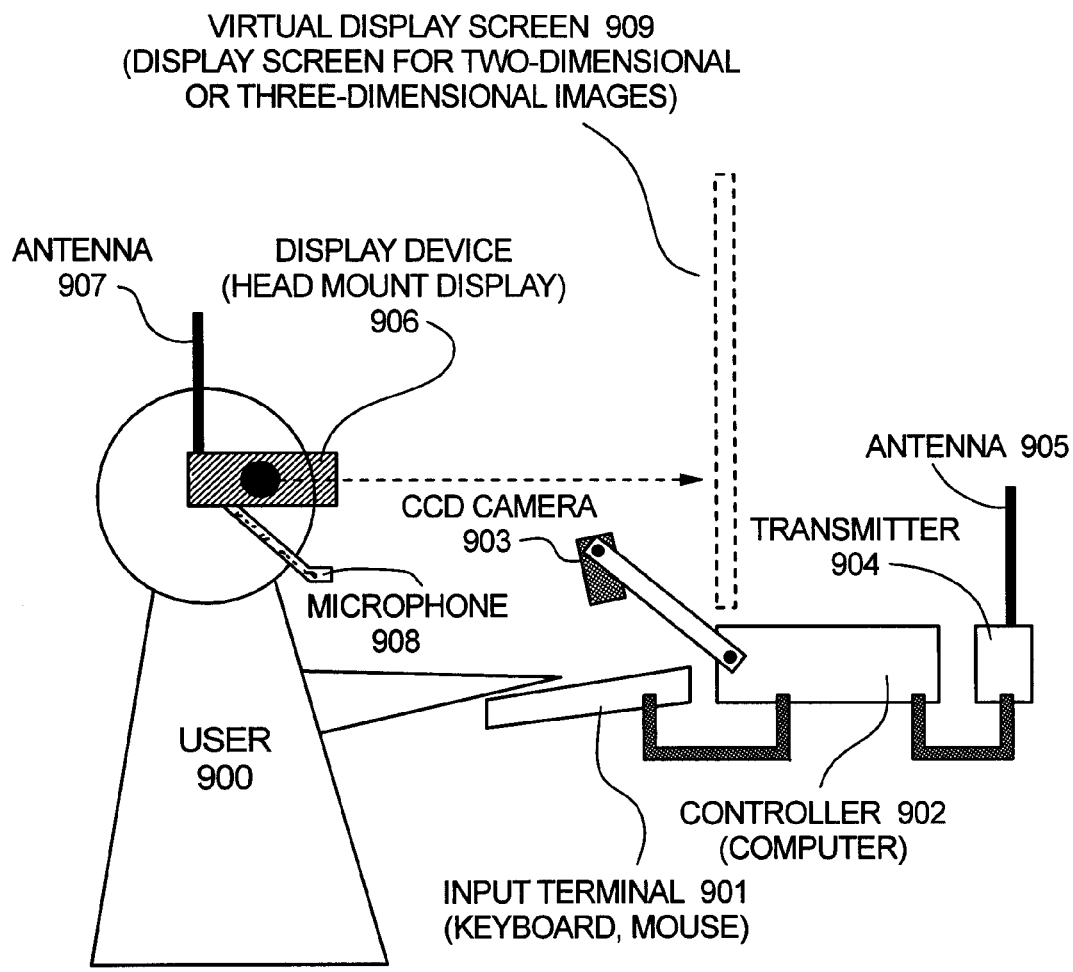
FIG. 9 is a schematic view of still another embodiment of an information processing apparatus according to the present invention.

The present embodiment describes still another mode of carrying out the invention with reference to FIG. 9. FIG. 9 is a schematic view of an information processing apparatus of the present embodiment.

As shown in FIG. 9, the information processing apparatus of the present embodiment comprises an input terminal 901, a controller (a computer or the like) 902, a CCD camera 903, a transmitter 904, a display device (HMD) 906, a microphone 908 and the like. While only one CCD camera is illustrated according to the present embodiment, a plurality of CCD cameras may be provided.

In the present embodiment, the voice of a user 900 is picked up by the microphone 908 and the same information is supplied to the display 906. The display device 906 supplies the information from a transmitter incorporated therein to the transmitter 904 connected to the controller 902. The controller 902 recognizes the voice of the user and performs various processes thereon.

Liquid crystal panels of the display device used in the information processing apparatus of the present embodiment may be also provided according to the method of fabrication described in the first embodiment.

A sixth embodiment of the present invention will now be described.

Figure 10:
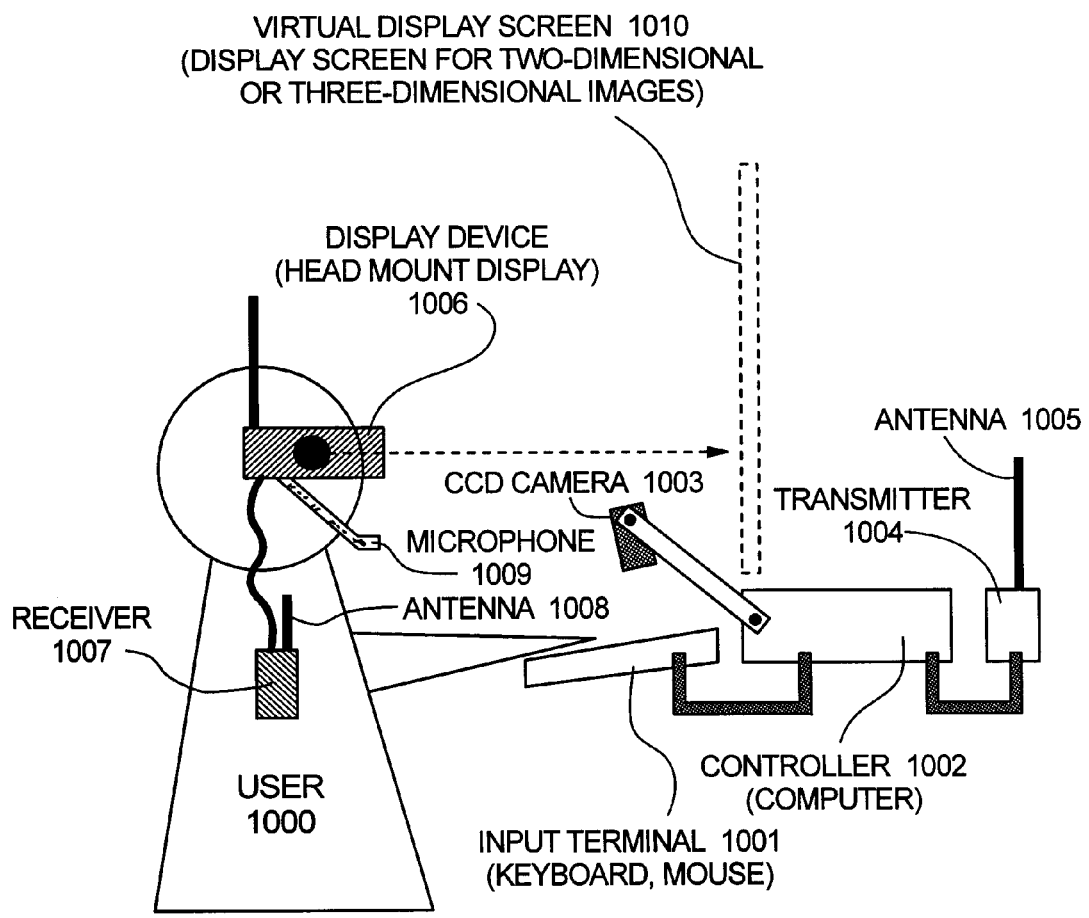
FIG. 10 is a schematic view of still another embodiment of an information processing apparatus according to the present invention.

The present embodiment describes still another mode of carrying out the invention with reference to FIG. 10. FIG. 10 is a schematic view of an information processing apparatus of the present embodiment.

As shown in FIG. 10, the information processing apparatus of the present embodiment comprises an input terminal 1001, a controller (a computer or the like) 1002, a CCD camera 1003, a transmitter 1004, a display device (HMD) 1006, a receiver 1007, a microphone 1009 and the like. While only one CCD camera is illustrated according to the present embodiment, a plurality of CCD cameras may be provided.

The information processing apparatus of the present embodiment is characterized in that the receiver incorporated in the display device of the information processing apparatus described in the fifth embodiment is externally provided. This allows some reduction of the weight of the display device.

Liquid crystal panels of the display device used in the information processing apparatus of the present embodiment may be also provided according to the method of fabrication described in the first embodiment.

A seventh embodiment of the present invention will now be described.

Figure 11:
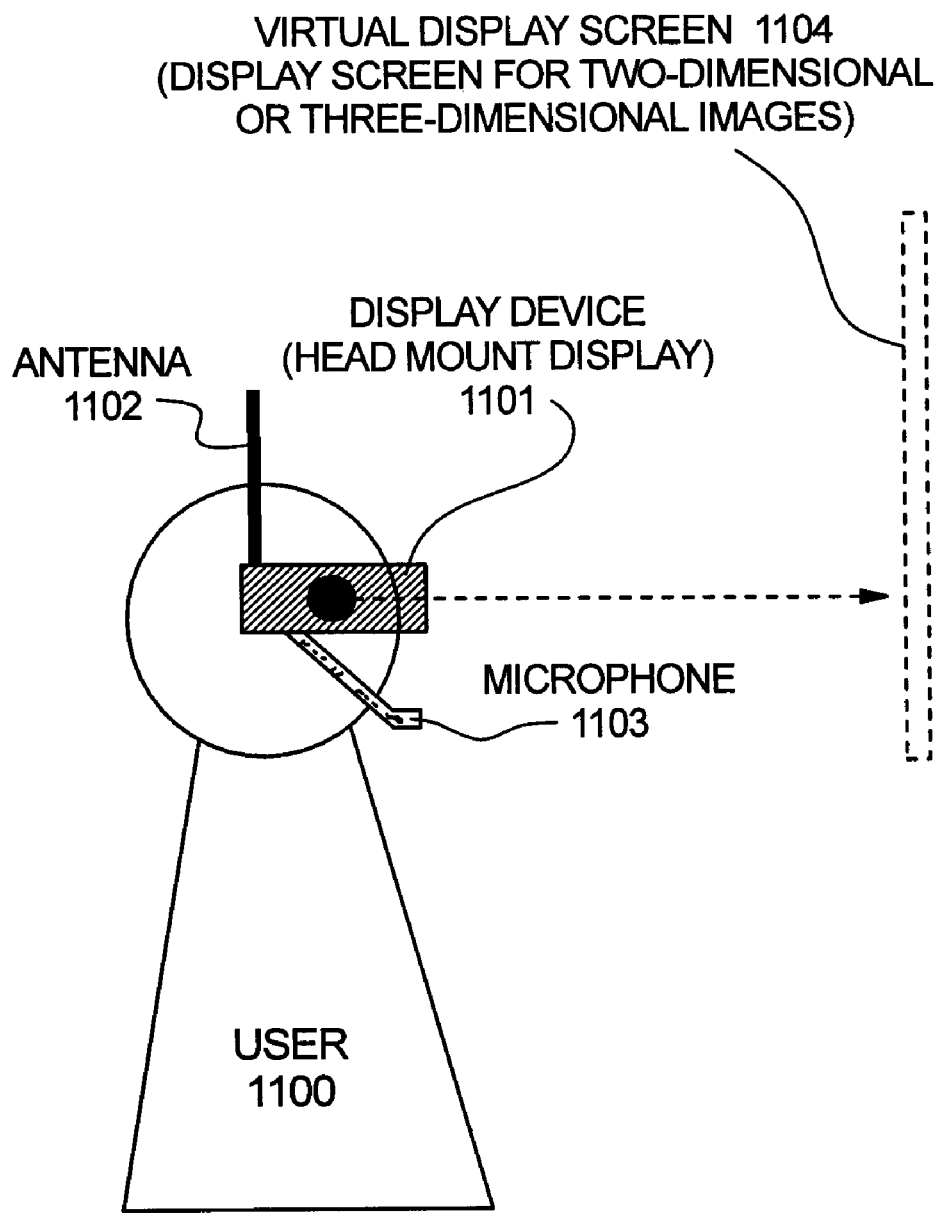
FIG. 11 is a schematic view of still another embodiment of an information processing apparatus according to the present invention.

The present embodiment describes still another mode of carrying out the invention with reference to FIG. 11. In FIG. 11, there is shown a schematic view of the information processing apparatus according to the present embodiment.

As shown in FIG. 11, the information processing apparatus of the present embodiment comprises a display device (HMD) 1101, a receiver (not shown), a transmitter (not shown), an antenna 1102, a microphone 1103 and the like. 1104 designates a virtual display screen which is actually observed by a user. While the transmitter and receiver of the present embodiment are incorporated in the display device 1101, they may be provided externally as in the sixth embodiment.

The information processing apparatus of the present embodiment has a function of displaying a virtual display screen in an overlapping relationship with the surrounding scene as described in the first embodiment. This allows a user to go out with the information processing apparatus of the present embodiment worn by him or her. If the view of the environment is shut out, the user can concentrate on the virtual display screen. This also allows the user to relax because the user is isolated from the environment surrounding him or her. Needless to say, a switching device is provided to allow the user to switch such modes. The display device may have a configuration including a function of automatic switching depending on image signals input thereto.

Figure 12:
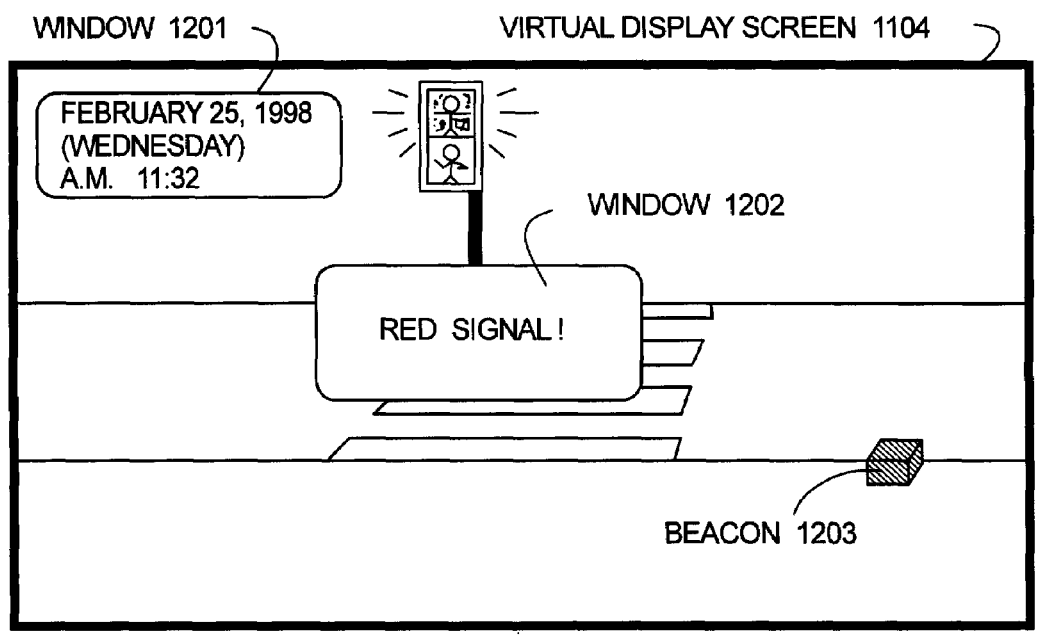
FIG. 12 illustrates a virtual display screen of an information processing apparatus according the present invention.

Reference is now made to FIG. 12. FIG. 12 shows a virtual display screen 1104 according to the present embodiment. FIG. 12 shows a situation in which a user actually observes the information processing apparatus of the present invention in use while the user is walking.

When a traffic light turns red as the user approaches it, information from a beacon 1203 installed on the street is received by the receiver of the display device, which causes a window 1202 showing information such as "red signal!" to appear on the virtual display screen 1104 on the display device. This allows even a user with a weak sight to notice the red signal quickly.

It is also possible to alert a user with low hearing ability by displaying a window showing information indicating that a train is approaching in the virtual display screen 1104 based on information from a beacon installed at a train station.

A window 1201 showing date and time may be always shown.

Liquid crystal panels of the display device used in the information processing apparatus of the present embodiment may be also provided according to the method of fabrication described in the first embodiment.

An eighth embodiment of the present invention will now be described.

While the above-described first through seventh embodiments have referred to the use of liquid crystal panels as display devices used in information processing apparatuses according to the invention, an active matrix type EL (electroluminescence) display device or the like may alternatively be used. Furthermore, an image sensor or the like having a photoelectric conversion layer may be formed on the same substrate.

A ninth embodiment of the present invention will now be described.

In the display devices of the first through seventh embodiments, the writing period must be short to achieve high resolution. The present embodiment refers to an example in which antiferroelectric liquid crystal having substantially no threshold is used as the material of the liquid crystal panels used in each of the embodiments when image information with relatively high image quality is used.

A liquid crystal material used in a conventional LCD suffers from a low speed of response to the application of a voltage (in the range from several tens ms to several hundred ms) and, even if a driving circuit is formed, for example, by TFTs operable at a high frequency band using crystalline silicon (CGS), the liquid crystal material can not respond to such a high speed operation.

In the present embodiment, however, crystalline silicon (CGS) is used; TFTs operable at a high frequency band are used as switching elements for liquid crystal panels; and antiferroelectric liquid crystal is used which has a high speed of response to the application of a voltage and which has substantially no threshold. This makes it possible to provide a display device having high definition and high resolution free from flickers.

This is advantageous also in a case wherein ferroelectric liquid crystal is used as the material of liquid crystal panels and a special alignment layer is used to eliminate a memory effect of the ferroelectric liquid crystal.

A tenth embodiment of the present invention will now be described.

The present embodiment refers to an example of a configuration wherein red (R), green (G) and blue (B) light emitting diodes are used as back lights and incorporated in the main body of a display device. Referring to color display in this case, for example, each of the R, G and B light emitting diodes is blinked such that they are repeated in a sequence of R, G, B, R, G, B, R, in a time series at a frequency which is three times the writing period for one screen (frame frequency), which causes human eyes to recognize a color image. In the present embodiment, one screen was written at 60 Hz and each of the R, G and B light emitting diodes was blinked such that they were repeated in a sequence of R, G, B, R, G, B, R, in a time series at a frequency of 180 Hz which was three times the same. There is no special limitation on the writing period for one screen (referred to as "frame frequency") as long as it is 45 Hz or more and preferably 60 Hz or more. In this case, since no color filter is needed, bright display can be achieved.

The back lights may be configured using light emitting elements such as EL elements instead of light emitting diodes.

An eleventh embodiment of the present invention will now be described.

While the first embodiment has referred to the fabrication of a liquid crystal panel by using Ni as a catalytic element, according to the present embodiment, a liquid crystal panel is fabricated using Ge (germanium) as a catalytic element.

A liquid crystal panel fabricated according to the present embodiment may obviously be used in the above-described second through tenth embodiments.

An information processing apparatus according to the present invention employs a head mount display (HMD) as means for providing a user with an image and can display a plurality of pieces of information at a time on a virtual display screen provided by the head mount display. This makes it possible to reduce the size of an information processing apparatus while providing images having high definition and high resolution.

In addition, while it has been difficult to read small characters on a conventional HMD because of its low resolution, a liquid crystal panel used in an information processing apparatus according to the present invention allows accurate information processing operations because it allows even small characters on it to be clearly recognized. That is, the HMD disclosed in this specification is optimum as a display device of an information processing apparatus.

What is claimed is:

1. An information processing device comprising:
a display device having flat panel displays for right and left eyes mounted on the head of a user;
a controller which transmits a first information to at least one of said flat panel displays to display said first information;
an input operation device connected to said controller; and
a camera provided over said input operation device,
wherein said controller transmits a signal in the form of an electric wave to said display device and wherein said flat panel displays are capable of displaying a plurality of pieces of information at a time,
wherein said display device, said controller, said input operation device and said camera are adapted to be used by the same user, and
wherein an image second information different from said first information is transmitted from a TV tuner to said at least one of said flat panel displays to display said image second information.

2. A device according to claim 1, wherein said flat panel displays comprise a display device on which one screen is written at frequencies in the range from 30 Hz to 180 Hz and on which screen display is carried out with the polarity of the voltage applied to the pixel electrodes inverted for each screen.

3. A device according to claim 1, wherein said flat panel displays comprise a display device which is a liquid crystal display using a liquid crystal material which is antiferroelectric liquid crystals or ferroelectric liquid crystals substantially having no threshold.

4. A device according to claim 1 wherein said camera is provided apart from said display device.

5. A device according to claim 1, wherein the controller is a computer.

6. A device according to claim 1, wherein the camera picks up an image and converts the image into an electrical signal to supply the electrical signal to the controller as one piece of the first information.

7. An information processing device comprising:
a display device having flat panel displays for right and left eyes mounted on the head of a user;
a controller which transmits a first information to at least one of said flat panel displays to display said first information;
an input operation device connected to said controller; and
a camera connected to said controller,
wherein said controller transmits a signal in the form of an electric wave to said display device and wherein said flat panel displays are capable of displaying a plurality of pieces of information at a time, and
wherein said display device, said controller, said input operation device and said camera are adapted to be used by the same user, and
wherein an image second information different from said first information is transmitted from a TV tuner to said at least one of said flat panel displays to display said image second information.

8. A device according to claim 7, wherein the plane of said channel formation regions is oriented substantially in a {110}-direction.

9. A device according to claim 7, wherein 90% or more of crystal lattices at grain boundaries of said channel formation regions have continuity.

10. A device according to claim 7, wherein the controller is a computer.

11. A device according to claim 7, wherein the camera picks up an image and converts the image into an electrical signal to supply the electrical signal to the controller as one piece of the first information.

12. An information processing device comprising:
a display device having flat panel displays for right and left eyes mounted on the head of a user, each of said flat panel displays comprising a pixel thin film transistor and a driver thin film transistor provided over a same substrate, said driver thin film transistor provided in a driving circuit;
a camera provided over said input operation device;
a controller which transmits a first information to at least one of said flat panel displays to display said first information; and
an input operation device connected to said controller, wherein said controller transmits a signal in the form of an electric wave to said display device and wherein said flat panel displays are capable of displaying a plurality of pieces of information at a time, wherein said display device, said controller, said input operation device and said camera are adapted to be used by the same user, and wherein an image second information different from said first information is transmitted from a TV tuner to said at least one of said flat panel displays to display said image second information.

13. A device according to claim 12, wherein channel formation regions of TFTs connected to pixel electrodes of the flat panel displays of said display device are constituted by a semiconductor thin film formed by a collection of a plurality of bar-shaped or planar bar-shaped crystals formed on an insulating surface.

14. A device according to claim 13, wherein the plane of said channel formation regions is oriented substantially in a {110}-direction.

15. A device according to claim 13, wherein 90% or more of crystal lattices at grain boundaries of said channel formation regions have continuity.

16. A device according to claim 12, wherein said flat panel displays comprise a display device on which one screen is written at frequencies in the range from 30 Hz to 180 Hz and on which screen display is carried out with the polarity of the voltage applied to the pixel electrodes inverted for each screen.

17. A device according to claim 12, wherein said flat panel displays comprise a display device which is a liquid crystal display using a liquid crystal material which is antiferroelectric liquid crystals or ferroelectric liquid crystals substantially having no threshold.

18. A device according to claim 12 wherein said driving circuit comprises a source-side driving circuit.

19. A device according to claim 12, wherein the controller is a computer.

20. A device according to claim 12, wherein the camera picks up an image and converts the image into an electrical signal to supply the electrical signal to the controller as one piece of the first information.

21. An information processing device comprising:
a display device having flat panel displays for right and left eyes mounted on a head of a user;
a controller which transmits a first information to at least one of said flat panel displays to display said first information;
an input operation device connected to said controller; and an image pick-up device provided over said input operation device,
wherein said controller transmits a signal in the form of an electric wave to said display device, wherein said image pick-up device converts at least images of said input operation device and a hand of said user into electrical signals and supplies said electrical signals to said controller and wherein said flat panel displays display a plurality of pieces of information including at least said images of the input operation device and said hand of the user at a time,
wherein said display device, said controller, said input operation device and said image pick-up device are adapted to be used by the same user, and
wherein an image second information different from said first information is transmitted from a TV tuner to said at least one of said flat panel displays to display said image second information.

22. A device according to claim 21, wherein channel formation regions of TFTs connected to pixel electrodes of the flat panel displays of said display device are constituted by a semiconductor thin film formed by a collection of a plurality of bar-shaped or planar bar-shaped crystals formed on an insulating surface.

23. A device according to claim 22, wherein the plane of said channel formation regions is oriented substantially in a {110}-direction.

24. A device according to claim 22, wherein 90% or more of crystal lattices at grain boundaries of said channel formation regions have continuity.

25. A device according to claim 21, wherein said flat panel displays comprise a display device on which one screen is written at frequencies in the range from 30 Hz to 180 Hz and on which screen display is carried out with the polarity of the voltage applied to the pixel electrodes inverted for each screen.

26. A device according to claim 21, wherein said flat panel displays comprise a display device which is a liquid crystal display using a liquid crystal material which is antiferroelectric liquid crystals or ferroelectric liquid crystals substantially having no threshold.

27. A device according to claim 21 wherein said image pick-up device is provided apart from said display device.

28. A device according to claim 21, wherein the controller is a computer.

29. An information processing device comprising:
a display device having flat panel displays for right and left eyes mounted on the head of a user, each of said flat panel displays comprising a pixel thin film transistor and a driver thin film transistor provided over a same substrate, said driver thin film transistor provided in a driving circuit;
a controller which transmits a first information to at least one of said flat panel displays to display said first information;
an input operation device connected to said controller; and
a camera provided over said input operation device,
wherein said controller transmits a signal in the form of an electric wave to said display device and wherein said flat panel displays are capable of displaying a plurality of window screens at a time, and
wherein said display device, said controller, said input operation device and said camera are adapted to be used by the same user, and
wherein an image second information different from said first information is transmitted from a TV tuner to said at least one of said flat panel displays to display said image second information.

30. A device according to claim 29, wherein the controller is a computer.

31. A device according to claim 29, wherein the camera picks up an image and converts the image into an electrical signal to supply the electrical signal to the controller as one piece of the first information.

32. An information processing device comprising:
a display device having a flat panel display mounted on a head of a user;
a controller which transmits a first information to said flat panel display to display said first information;
an input operation device connected to said controller; and
a camera provided over said input operation device,
wherein said controller transmits a signal in the form of an electric wave to said display device and wherein said flat panel display is capable of displaying a plurality of pieces of information at a time, wherein said display device, said controller, said input operation device and said camera are adapted to be used by the same user, and wherein an image second information different from said first information is transmitted from a TV tuner to said flat panel display to display said image second information.

33. A device according to claim 32, wherein the controller is a computer.

34. A device according to claim 32, wherein the camera picks up an image and converts the image into an electrical signal to supply the electrical signal to the controller as one piece of the first information.

35. An information processing device comprising:
a display device having a flat panel display mounted on a head of a user, said flat panel display comprising a pixel thin film transistor and a driver thin film transistor provided over a same substrate, said driver thin film transistor provided in a driving circuit;
a camera provided over said input operation device;
a controller which transmits a first information to said flat panel display to display said first information; and
an input operation device connected to said controller,
wherein said controller transmits a signal in the form of an electric wave to said display device and wherein said flat panel display is capable of displaying a plurality of pieces of information at a time,
wherein said display device, said controller, said input operation device and said camera are adapted to be used by the same user, and
wherein an image second information different from said first information is transmitted from a TV tuner to said flat panel display to display said image second information.

36. A device according to claim 25, wherein the controller is a computer.

37. A device according to claim 35, wherein the camera picks up an image and converts the image into an electrical signal to supply the electrical signal to the controller as one piece of the first information.

38. An information processing device comprising:
a display device having a flat panel display mounted on a head of a user;
a controller which transmits a first information to said flat panel display to display said first information;
an input operation device connected to said controller; and an image pick-up device provided over said input operation device,
wherein said controller transmits a signal in the form of an electric wave to said display device, wherein said image pick-up device converts at least images of said input operation device and a hand of said user into electrical signals and supplies said electrical signals to said controller and wherein said flat panel display displays a plurality of pieces of information including at least said images of the input operation device and said hand of the user at a time,
wherein said display device, said controller, said input operation device and said image pick-up device are adapted to be used by the same user, and
wherein an image second information different from said first information is transmitted from a TV tuner to said flat panel display to display said image information.

39. A device according to claim 38, wherein the controller is a computer.

40. An information processing device comprising:
a display device having a flat panel display mounted on a head of a user, said flat panel display comprising a pixel thin film transistor and a driver thin film transistor provided over a same substrate, said driver thin film transistor provided in a driving circuit;
a controller which transmit a first information to said flat panel display to display said first information;
an input operation device connected to said controller; and
a camera provided over said input operation device,
wherein said controller transmits a signal in the form of an electric wave to said display device and wherein said flat panel display is capable of displaying a plurality of window screens,
wherein said display device, said controller, said input operation device and said camera are adapted to be used by the same user, and
wherein an image second information different from said first information is transmitted from a TV tuner to said flat panel display to display said image second information.

41. A device according to claim 40, wherein the controller is a computer.

42. A device according to claim 40, wherein the camera picks up an image and converts the image into an electrical signal to supply the electrical signal to the controller as one piece of the first information.

* * * * *